United States Patent
Rabii et al.

(10) Patent No.: US 10,616,741 B2
(45) Date of Patent: Apr. 7, 2020

(54) IN-FLIGHT ENTERTAINMENT SYSTEMS WITH A CENTRAL BLUETOOTH CONTROLLER CONTROLLING BLUETOOTH CONNECTIONS BETWEEN PASSENGER TERMINALS AND VIDEO DISPLAY UNITS

(71) Applicant: Thales Avionics, Inc., Irvine, CA (US)

(72) Inventors: Khosro Rabii, San Diego, CA (US); Jean-Yves Couleaud, Mission Viejo, CA (US); Jay Eggenberger, Irvine, CA (US); Maneesha Bhate Sumien, Mission Viejo, CA (US)

(73) Assignee: Thales Avionics, Inc., Irvine, CA (US)

( * ) Notice: Subject to any disclaimer, the term of this patent is extended or adjusted under 35 U.S.C. 154(b) by 65 days.

(21) Appl. No.: 15/902,170

(22) Filed: Feb. 22, 2018

(65) Prior Publication Data
US 2018/0317071 A1 Nov. 1, 2018

Related U.S. Application Data

(63) Continuation-in-part of application No. 15/608,327, filed on May 30, 2017, now Pat. No. 10,464,675.
(Continued)

(51) Int. Cl.
| | |
|---|---|
| *H04W 12/08* | (2009.01) |
| *H04W 76/18* | (2018.01) |
| *H04W 4/80* | (2018.01) |
| *H04W 76/14* | (2018.01) |
| *H04W 12/00* | (2009.01) |
| *H04W 8/00* | (2009.01) |

(Continued)

(52) U.S. Cl.
CPC .......... *H04W 4/80* (2018.02); *H04W 12/003* (2019.01); *H04W 12/08* (2013.01); *H04W 76/14* (2018.02); *H04W 4/48* (2018.02); *H04W 8/005* (2013.01); *H04W 12/0013* (2019.01); *H04W 12/00505* (2019.01); *H04W 12/06* (2013.01); *H04W 12/1202* (2019.01); *H04W 76/18* (2018.02); *H04W 84/18* (2013.01)

(58) Field of Classification Search
CPC .............................. H04W 4/80; H04W 76/14
See application file for complete search history.

(56) References Cited

U.S. PATENT DOCUMENTS 9,355,396 B1 * 5/2016 Alkasimi ................ H04W 4/80
9,554,320 B2 * 1/2017 Yamamoto .......... B61L 27/0005
(Continued)

*Primary Examiner* — Irfan Habib

(57) ABSTRACT

An entertainment system includes video display units that can establish Bluetooth connections with user terminals. A central Bluetooth controller is connected to control establishment of Bluetooth connections between the user terminals and the video display units. The central Bluetooth controller receives connection authorization requests from the video display units, and generates connection authorization decisions based on application of a Bluetooth connection rule to characteristics of the user terminals which are identified from the connection authorization requests. The connection authorization decisions are then used to control whether Bluetooth connections are established between the user terminals and the video display units, and to control what security mode levels are used when establishing and using the Bluetooth connections for signaling therebetween.

21 Claims, 10 Drawing Sheets

Related U.S. Application Data which is a continuation-in-part of application No. 15/499,248, filed on Apr. 27, 2017, now Pat. No. 10,313,982.

(51) Int. Cl.
  *H04W 12/12* (2009.01)
  *H04W 84/18* (2009.01)
  *H04W 4/48* (2018.01)
  *H04W 12/06* (2009.01)

(56) References Cited

U.S. PATENT DOCUMENTS

| | | | |
|---|---|---|---|
| 9,813,969 B2* | 11/2017 | Axmon | H04W 36/00 |
| 9,883,437 B2* | 1/2018 | Abraham | H04W 36/0061 |
| 9,992,817 B2* | 6/2018 | Yuan | H04B 1/3822 |
| 2010/0240455 A1* | 9/2010 | Gagner | G07F 17/32 |
| | | | 463/30 |
| 2011/0219407 A1* | 9/2011 | Margis | H04N 7/163 |
| | | | 725/75 |
| 2012/0047289 A1* | 2/2012 | Krzystofczyk | H04L 63/083 |
| | | | 710/10 |
| 2012/0222058 A1* | 8/2012 | el Kaliouby | H04N 21/251 |
| | | | 725/10 |
| 2014/0071008 A1* | 3/2014 | Desclos | H01Q 1/243 |
| | | | 343/745 |
| 2014/0128032 A1* | 5/2014 | Muthukumar | H01Q 3/00 |
| | | | 455/411 |
| 2014/0241282 A1* | 8/2014 | Mueller | H04B 15/00 |
| | | | 370/329 |
| 2015/0296371 A1* | 10/2015 | Kong | H04W 8/18 |
| | | | 455/419 |
| 2016/0020838 A1* | 1/2016 | Desclos | H04B 7/0689 |
| | | | 455/500 |
| 2016/0127523 A1* | 5/2016 | Rouaissia | H04B 5/0012 |
| | | | 455/566 |
| 2016/0249156 A9* | 8/2016 | Varoglu | H04W 4/21 |
| 2016/0278151 A1* | 9/2016 | Kwon | H04W 76/14 |
| 2016/0309373 A1* | 10/2016 | Khawer | H04W 4/24 |
| 2017/0171494 A1* | 6/2017 | Rabii | H04N 21/4122 |
| 2017/0313426 A1* | 11/2017 | Morin | B64D 11/0015 |
| 2017/0355464 A1* | 12/2017 | Perng | H04W 4/80 |
| 2018/0234825 A1* | 8/2018 | Rochau | B64F 5/40 |
| 2018/0255491 A1* | 9/2018 | Rabii | H04W 36/32 |
| 2018/0293043 A1* | 10/2018 | Watson | G06F 3/1454 |

* cited by examiner

IN-FLIGHT ENTERTAINMENT SYSTEMS WITH A CENTRAL BLUETOOTH CONTROLLER CONTROLLING BLUETOOTH CONNECTIONS BETWEEN PASSENGER TERMINALS AND VIDEO DISPLAY UNITS

RELATED APPLICATIONS

The present patent application is a continuation-in-part patent application claiming benefit of priority from U.S. patent application Ser. 15/608,327, filed May 30, 2017, and claiming benefit of priority from U.S. patent application Ser. No. 15/499,248, filed Apr. 27, 2017, the disclosures of which are hereby incorporated herein in their entirety by reference.

FIELD OF THE INVENTION

The present disclosure relates to aircraft-based in-flight entertainment systems that communicate with mobile terminals using Bluetooth communication links.

BACKGROUND

In-flight entertainment (IFE) systems have been deployed onboard aircraft to provide entertainment, such as movies, television, audio entertainment programming, electronic games, and other electronic content to passengers. IFE, systems are increasingly using Bluetooth networks to interconnect seat video display units (SVDUs) to wireless user terminals that can be operated by passengers. Such user terminals can include passenger control units (PCUs) supplied as aircraft equipment and include passenger electronic devices (PEDs) that are transported onto the aircraft by the passengers. Such PEDs can include cellular phones, tablet computers, laptop computers, wireless headphones, etc. Passengers can operate the user terminals to select content for playback through display devices and/or speakers within or connected to the SVDUs.

It is important to maintain operational security of IFE systems having Bluetooth connectivity. However, the level of operational security is balanced against the importance of promoting an enjoyable passenger and crew experience by simplifying the pairing process for establishing Bluetooth connections between user terminals and SVDUs. SVDUs could be vulnerable to hacking or other attack during establishment of Bluetooth connections by cloning devices that appear to be an authorized device. Bluetooth communications may be improperly eavesdropped and/or modified by an unauthorized device, e.g., man-in-the-middle attack, if insufficient Bluetooth security modes are utilized. Moreover, SVDUs could be rendered inoperative by denial of service attacks by a malicious or faulty Bluetooth device initiating a high rate of repeated pairing processes.

SUMMARY

Some embodiments of the present disclosure are directed to an entertainment system that includes video display units that can establish Bluetooth connections with user terminals. A central Bluetooth controller is connected to control establishment of Bluetooth connections between the user terminals and the video display units. The central Bluetooth controller receives connection authorization requests from the video display units, and generates connection authorization decisions based on application of a Bluetooth connection rule to characteristics of the user terminals which are identified from the connection authorization requests. The connection authorization decisions are then used to control whether Bluetooth connections are established between the user terminals and the video display units, and to control what security mode levels are used when establishing and using the Bluetooth connections.

Other systems, video display units, central Bluetooth controllers and/or corresponding methods according to embodiments of the inventive subject matter will be or become apparent to one with skill in the art upon review of the following drawings and detailed description. It is intended that all such additional systems, video display units, central Bluetooth controllers and/or corresponding methods be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
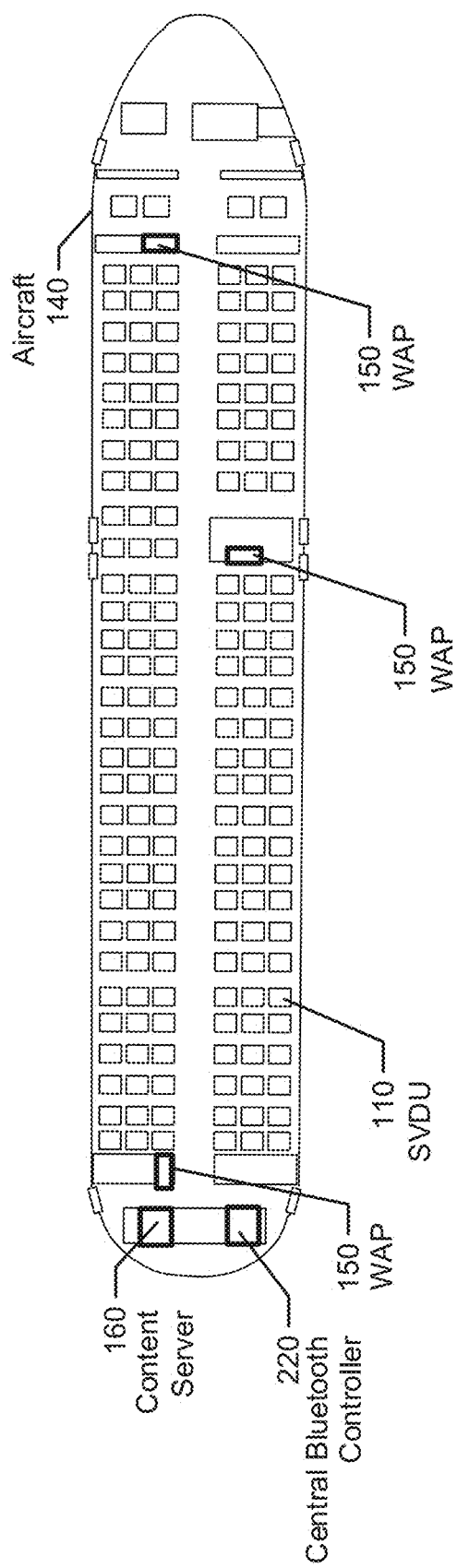
FIG. 1 illustrates an aircraft cabin containing an in-flight entertainment (IFE) system having a central Bluetooth controller that controls Bluetooth connections between seat video display units (SVDUs) and passenger terminals in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, it is important to maintain operational security of IFE systems providing Bluetooth connectivity while also promoting an enjoyable passenger experience by simplifying the pairing process for establishing Bluetooth connections between user terminals and SVDUs. Various embodiments of the present disclosure are directed to providing a central Bluetooth controller that is connected to control establishment of Bluetooth connections between user terminals and video display units in an entertainment system. The central Bluetooth controller receives connection authorization requests from the video display units, and generates connection authorization decisions based on application of a Bluetooth connection rule to characteristics of the user terminals which are identified from the connection authorization requests. The connection authorization decisions are then used to control whether Bluetooth connections are established between the user terminals and the video display units, and to control what security mode levels are used when establishing and using the Bluetooth connections for signaling therebetween.

Various embodiments are explained below in the non-limiting context of an In-Flight Entertainment (IFE) system that includes seat video display units (SVDUs) that communicate through Bluetooth connections with user terminals, which are also referred to as passenger control units (PCUs) and passenger electronic devices (PEDs). The PCUs can be supplied as aircraft equipment. The PEDs can be transported onto the aircraft by the passengers and include mobile phones, tablet computers, laptop computers, wireless Bluetooth headphones, etc. The SVDUs and user terminals each include Bluetooth transceivers that are configured to transmit and receive radio frequency (RF) signals, such as in the ISM band. Although various embodiments herein are primarily described in the context of an IFE system deployed onboard an aircraft, the invention is not limited thereto. Instead, these and other related embodiments may be used to control wireless communication transceivers located in other types of vehicles, including without limitation, trains, automobiles, cruise ships, and buses, and in other non-vehicle installations, including without limitation, meeting rooms, sports stadiums, etc.

Embodiments are also described in the non-limiting context of the Bluetooth transceivers being configured to transmit and receive using radio resources in the ISM band. As used herein, the term "ISM band" refers to one or more frequency ranges that are reserved internationally for the use of radio frequency energy for unlicensed and/or licensed communications. The term "band" can refer to one continuous frequency range or a plurality of non-continuous frequency ranges that are defined by the ITU Radio Regulations for ISM communications.

FIG. 1 illustrates an aircraft fuselage 140 containing an IFE system that provides entertainment services to passengers. The IFE system can include a content server 160 that streams and/or downloads electronic content through wired networks (e.g., Ethernet) and/or through wireless access points (WAPs) 150 to seat video display units (SVDUs) 110 that may be mounted to structures within the aircraft, including to seatbacks, seat armrests/frames, bulkheads, overhead structures, etc. The content server 160 may additionally stream and/or download electronic content through WAPs 150 to PCUs and/or to PEDs. The SVDUs 110 may each contain a Bluetooth transceiver that wirelessly communicates through ISM band RF signaling with Bluetooth transceivers within the user terminals. The PCUs may be configured to be releasable docked to armrest docket stations and/or to docket stations connected to or adjacent to some or all of the SVDUs 110. The Bluetooth transceiver within a SVDU 110 is understood to be the communication circuitry (i.e., transceiver, signal processor, etc.) which can be incorporated within the same housing that at least partially encloses a display device, video display circuitry, network interface, and other circuitry providing functionality for the SVDU 110.

Some or all of the seats may be associated with a docking station may have a wired interface. The SVDU 110 facing the seat includes a processor that is connected to communicate through a Bluetooth transceiver and through the wired interface of the docking station. A PCU can include a processor connected to communicate through a wired interface and to communicate through a Bluetooth transceiver. The PCU may be configured to be releasably docked in the docking station to communicatively connect the wired interfaces of the PCU and the docking station. While docked in the docking station the processor of the PCU and the processor of the SVDU are configured to communicate through the wired interfaces of the PCU and the docking station to establish a Bluetooth connection between the Bluetooth transceivers of the PCU and the SVDU. The processor of the PCU may be configured to not operate to establish the Bluetooth connection using communications through the Bluetooth transceiver of the PCU while docked in the docking station. Accordingly, a Bluetooth connection between a pair of Bluetooth transceivers in a PCU and a SVDU 110 can be establish through wired communications via the docking station, and subsequent communications while the Bluetooth connection is maintained (e.g., unrelated to establishing the Bluetooth connection) are then performed through the Bluetooth transceivers.

In accordance with various present embodiments, the system includes a central Bluetooth connection controller 220 that is communicatively connected to the SVDUs 110 through a wired network, such as Ethernet, and/or through the WAPs 150 via a wireless network such as WiFi 802.11. The central Bluetooth connection controller 220 is configured to control setup, maintenance, and/or termination of Bluetooth connections between the SVDUs 110 and the user terminals.

Figure 2:
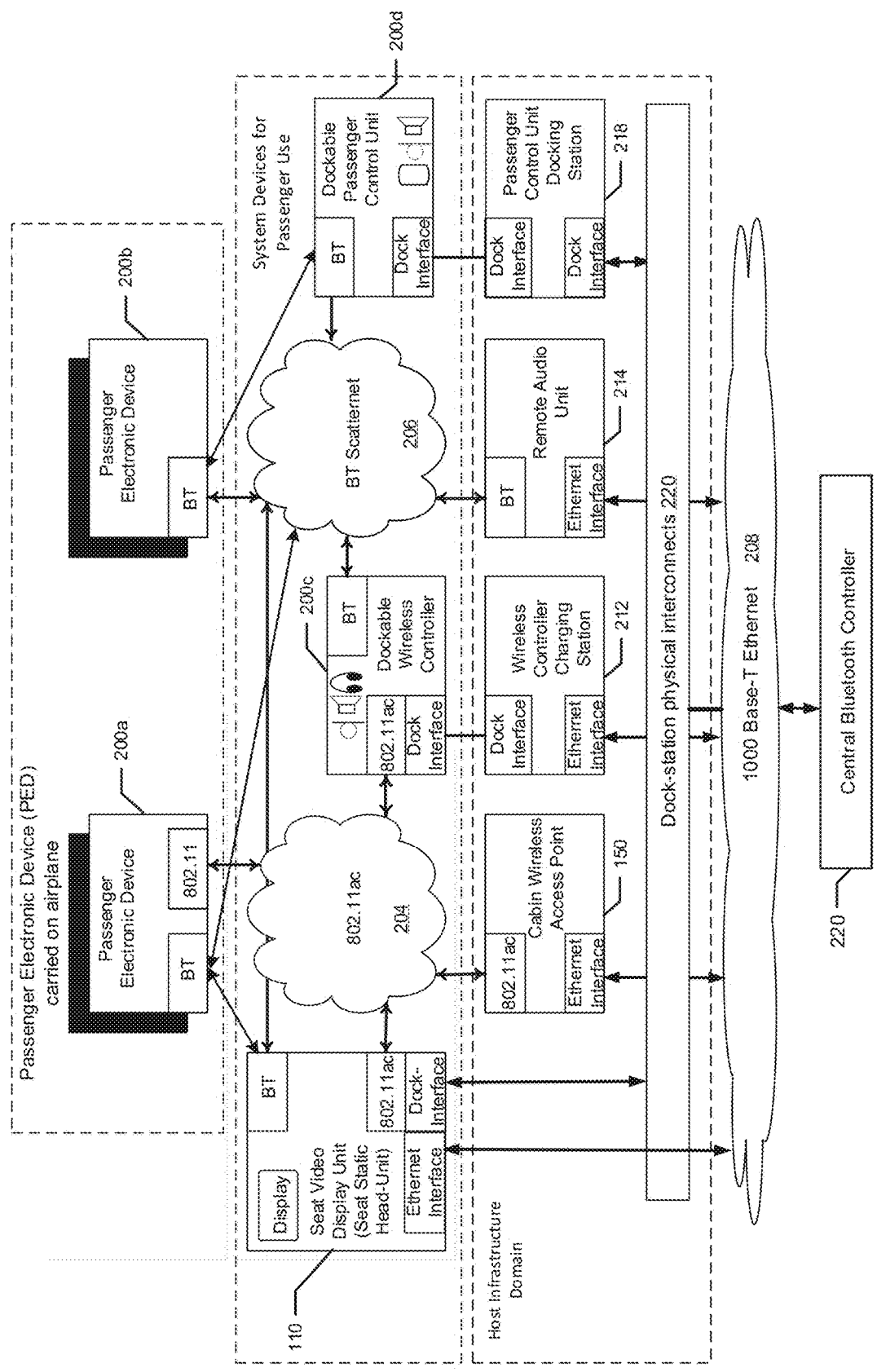
FIG. 2 is a block diagram illustrating the IFE system of FIG. 1 having elements that are configured to operate in accordance with some embodiments of the present disclosure.

FIG. 2 is a block diagram of the IFE system of FIG. 1 having elements that are configured to operate in accordance with some embodiments of the present disclosure. Referring to FIG. 2, the IFE system includes system devices that can be located at each passenger seat location, and which is configured to communicate with various types of user terminals that can be provided by the airline and/or carried on-board by passengers. The seat-located system devices can communicate using RF resources within the ISM band with the user terminals using a Bluetooth (BT) scatternet wireless network 206 and may use an IEEE 802.11ac wireless network 204. The example user terminals include PEDs 200a having both a Bluetooth transceiver and a IEEE 802.11 (WiFi) transceiver and other user terminals 200b having a Bluetooth transceiver.

The system devices can include a SVDU 110, a dockable wireless controller 200c, and a dockable PCU 200d. The system may include only one or both of the dockable wireless controller 200c and the dockable passenger control unit 200d, which may be the same or similar type of device or may be different types of devices, and which can be collectively referred to as wireless controllers. The dockable wireless controller 200c and the dockable PCU 200d can be operated by a passenger to wirelessly control the SVDU 110, such as to select content that is consumed (e.g., played through a display device), select among menu items, and control other operations of the SVDU 110. Audio content may be streamed through the Bluetooth connection from the SVDU 110 to a user terminal, e.g., Bluetooth headphones. Pictures, video, textual information, and/or commands may be communicated from the SVDU 110 to a user terminal through the Bluetooth connection.

The example SVDU 110 includes a display device, video display circuitry, a general-purpose processor, a Bluetooth transceiver, and an Ethernet interface or other wired network interface. The dockable wireless controller 200c includes a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The dockable PCU 200d can similarly include a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The wireless controller 200c, the passenger control unit 200d and dockable passenger control unit 200d, collectively referred to as wireless controller 200, may be configured as handheld devices for operation by passengers and can be stored in docking stations, which may be configured to recharge batteries within the handheld devices. A wireless controller 200 may be a handheld device that is owned by the aircraft operator and provided for temporary use by a passenger during a flight, or may be a PED carried on-board by passengers, such as mobile phones, tablet computers, laptop computers, wireless headphones, etc.

The seat-located system devices are connected to host infrastructure that can include the cabin wireless access points 150 spaced apart within the aircraft cabin and mounted to cabin ceiling structures, storage bin structures, bulkheads, etc. An Ethernet backbone network 208, e.g., 100 Base-T Ethernet, extends throughout the aircraft cabin to communicatively interconnect the seat-located system devices to the content server 160 and the wireless access points 150. The wireless access points 150 can each include an 802.11ac or other WiFi transceiver and an Ethernet interface that connects to the Ethernet backbone network 208.

The host infrastructure can include a PCU docking station 218, a wireless controller charging station 212 (although its functionality may be incorporated into the docking station 218), and a remote audio unit 214. The wireless controller charging station 212 may be located at each seat and have a dock interface that releasably stores the dockable wireless controller 200c and charges a battery therein, and has an Ethernet interface that connects to the Ethernet backbone network 208. The PCU docking station 218 may also be located at each seat and have a dock interface that releasably stores the dockable PCU 200d and charges a battery therein, and has an Ethernet interface that connects to the Ethernet backbone network 208.

The SVDU 110 facing a seat includes a processor that is connected to communicate through a Bluetooth transceiver and through the wired interface of the docking station 218. A wireless controller (PCU) 200 includes a processor connected to communicate through a wired interface and a Bluetooth transceiver. The wireless controller 200 is configured to be releasably docked in the docking station 218 to communicatively connect the wired interfaces of the wireless controller 200 and the docking station 218. While docked in the docking station 218 the processor of the wireless controller 218 and the processor of the display unit 110 may be configured to communicate through the wired interfaces of the wireless controller 200 and the docking station 218, via a dock-station physical interconnects (e.g., wired connections) 220, to establish a Bluetooth connection between the Bluetooth transceivers of the wireless controller 200 and the display unit 110. The processor of the wireless controller 200 may be configured to not operate to establish the Bluetooth connection using communications through the Bluetooth transceiver of the wireless controller 200. Accordingly, a Bluetooth connection between a pair of Bluetooth transceivers in a wireless controller 200 and a SVDU 110 is establish through wired communications and subsequent communications while the Bluetooth connection is maintained are then performed through the Bluetooth transceivers.

The system further includes the central Bluetooth controller 220 that is communicatively connected to the SVDUs 110 through the Ethernet backbone network 208 and/or through the WiFi 802.11 network 204.

The remote audio unit 214 may be located at each seat or adjacent to a group of seats, and can contain a wired headphone jack, a Bluetooth transceiver, and an Ethernet interface that connects to the Ethernet backbone network 208, to receive and play audio through a loudspeaker and/or through the Bluetooth transceiver and/or the wired headphone jack to a headset worn by one or more passengers.

Figure 3:
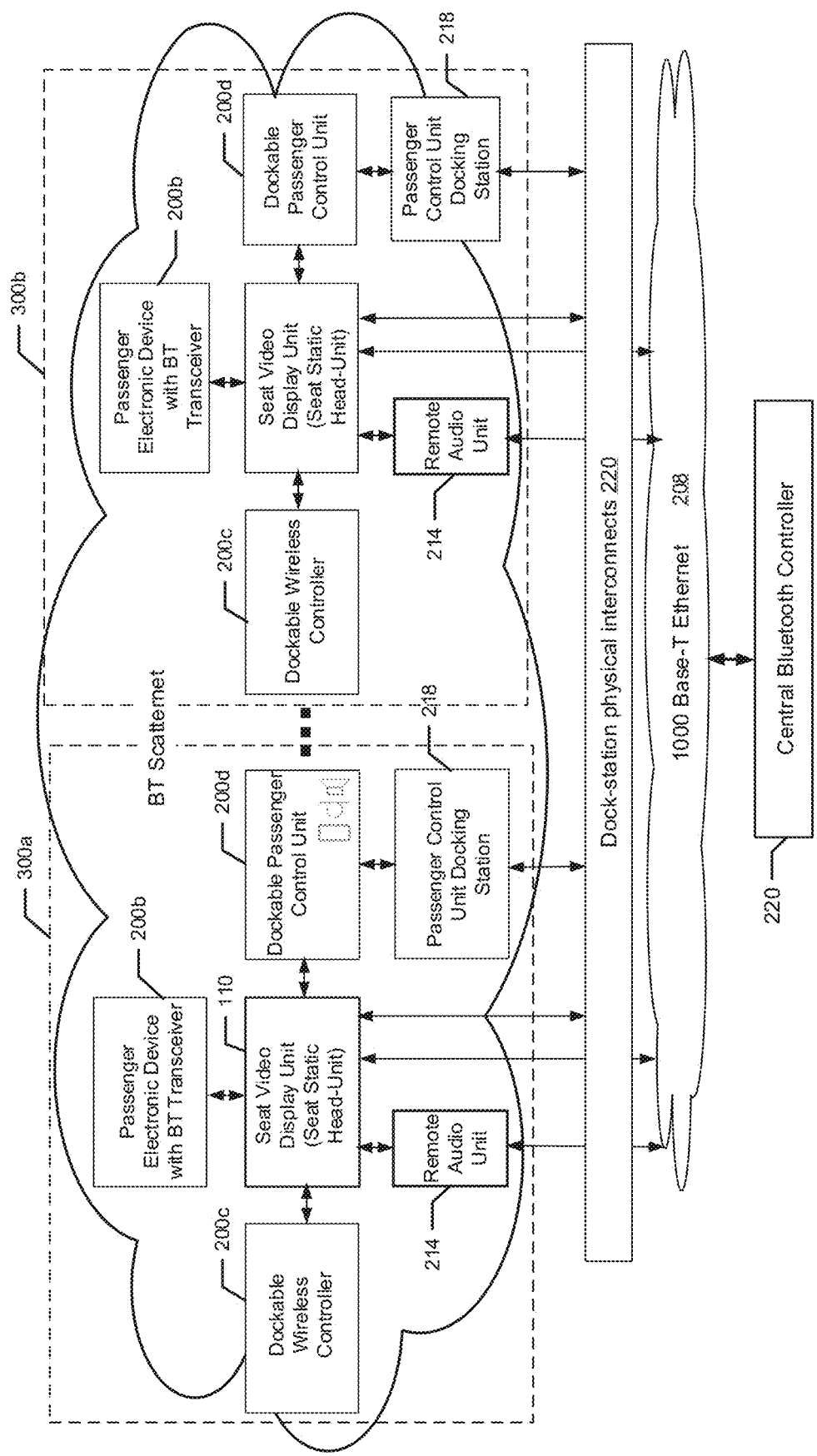
FIG. 3 is another block diagram of the IFE system of FIGS. 1-2 having elements that are configured to operate in accordance with some embodiments of the present disclosure.

FIG. 3 is another block diagram of the IFE system of FIGS. 1-2 having elements that are configured to operate in accordance with some embodiments of the present disclosure. Referring to FIG. 3, an example configuration of components is illustrated for two spaced apart seat locations 300a and 300b. Each seat location 300a/300b is illustrated as being configured to include a passenger equipment with Bluetooth transceiver 200b, a dockable wireless controller 200c, a SVDU 110, a dockable passenger controller unit 200d, a remote audio unit 214, and a passenger control unit docking station 218. These per-seat component configurations can be replicated for any number of seat locations, and one or more of the components that is illustrated as being replicated at each seat location may instead be connected to serve components at more than one seat location.

A dockable wireless controller 200c and a dockable passenger control unit 200d are paired with a particular SVDU 110 while whey they are docked in docking station 218. The dockable wireless controller 200c and a dockable passenger control unit 200d are collectively referred to as wireless controller 200. As explained above, while docked in the docking station 218 the processor of the wireless controller 200 and the processor of the SVDU 110 are configured to communicate through the wired interfaces of the wireless controller 200 via the dock-station physical interconnects (i.e., wired connections) 220 and the docking station 218. The processors of the SVDUs 110 are configured to communicate with the central Bluetooth controller 220 via the backbone Ethernet network 208 before establishing a Bluetooth connection between the Bluetooth transceivers of the SVDUs 110 and any of the user terminals 200. The central Bluetooth controller 220 receives connection authorization requests from the SVDUs 110, and generates connection authorization decisions based on application of a Bluetooth connection rule to characteristics of the user terminals 200 which are identified from the connection authorization requests. The connection authorization decisions are then used to control whether Bluetooth connections are established between the user terminals 200 and the SVDUs 110, and to control what security mode levels are used when establishing and using the Bluetooth connections.

Figure 4:
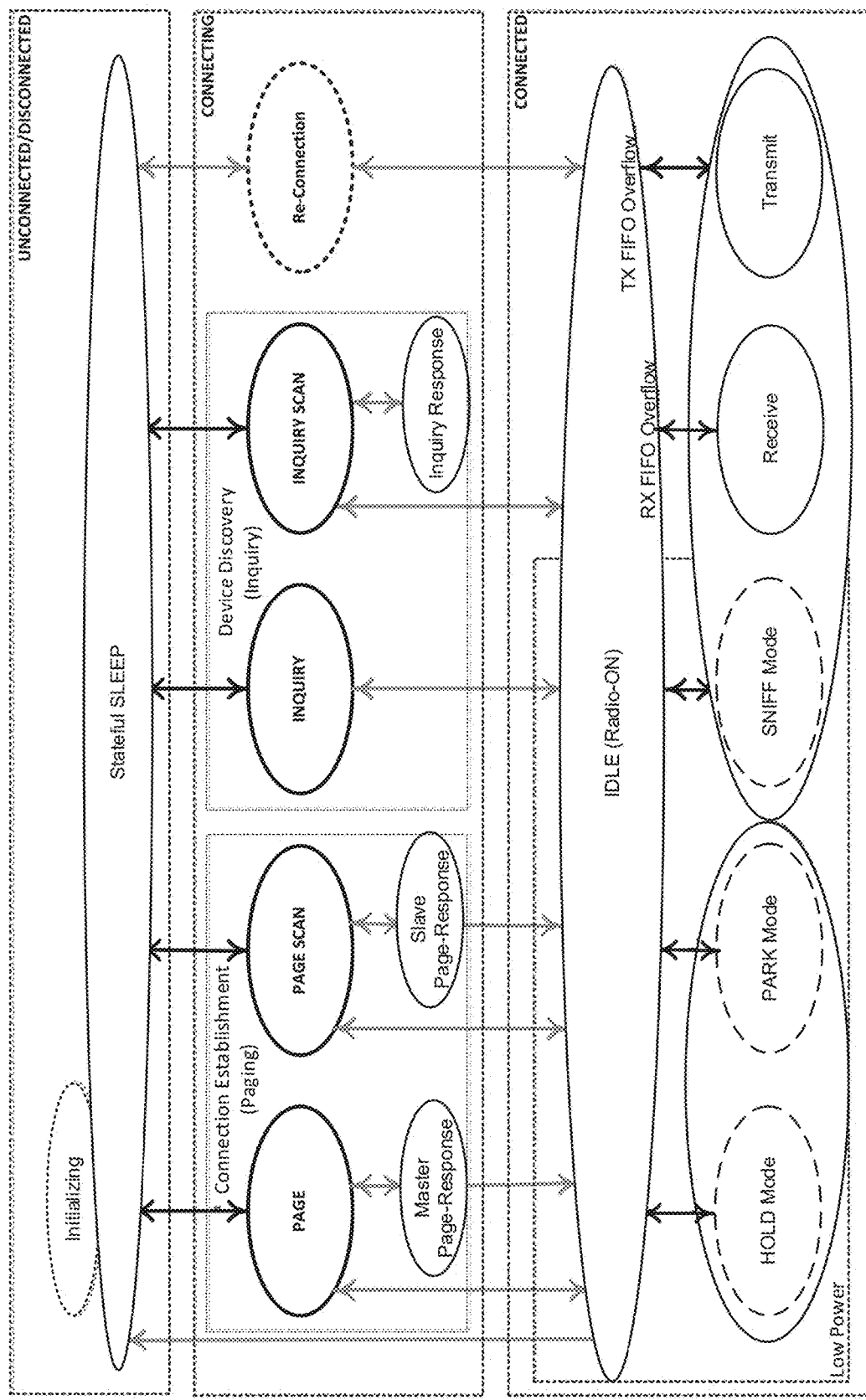
FIG. 4 is a flowchart and data flow diagram for various operational states of Bluetooth transceivers in the user terminals and the SVDUs of the system of FIGS. 1-3 in accordance with some embodiments of the present disclosure.

FIG. 4 is a flowchart and data flow diagram for various operational states of Bluetooth transceivers in the user terminals 200 and the SVDUs 110 of the system of FIGS. 1-3 in accordance with some embodiments of the present disclosure. Referring to FIG. 4, the type of operations performed by Bluetooth transceiver depends upon the state of the Bluetooth transceivers connection, which include includes: unconnected/disconnected; connecting; and connected. In the unconnected/disconnected state, the Bluetooth transceiver can operate in a statefull sleep operational mode, which is a lower power mode. In the connecting state, the Bluetooth transceiver operates to perform connection establishment (paging), device discovery (inquiry), and/or reconnection responsive to a lost connection. Connection establishment operations can include performing paging and paging scan. Device discovery operations can include performing inquiry and inquiry scan.

In the connected state, the Bluetooth transceiver performs idle operations (radio-on) while waiting for data to be received (via an antenna) into the receive FIFO buffer and waiting for data to be input to the transmit FIFO buffer awaiting transmission through the antenna. The Bluetooth transceiver also performs hold mode operations, Park mode operations, sniff mode operations, operations to receive data through the antenna into the receive FIFO buffer (e.g., for output to the processor of SVDU 110), and operations to transmit data that has been input to the transmit FIFO buffer (e.g. by the processor of the SVDU 110) for transmission through the antenna.

Figure 5:
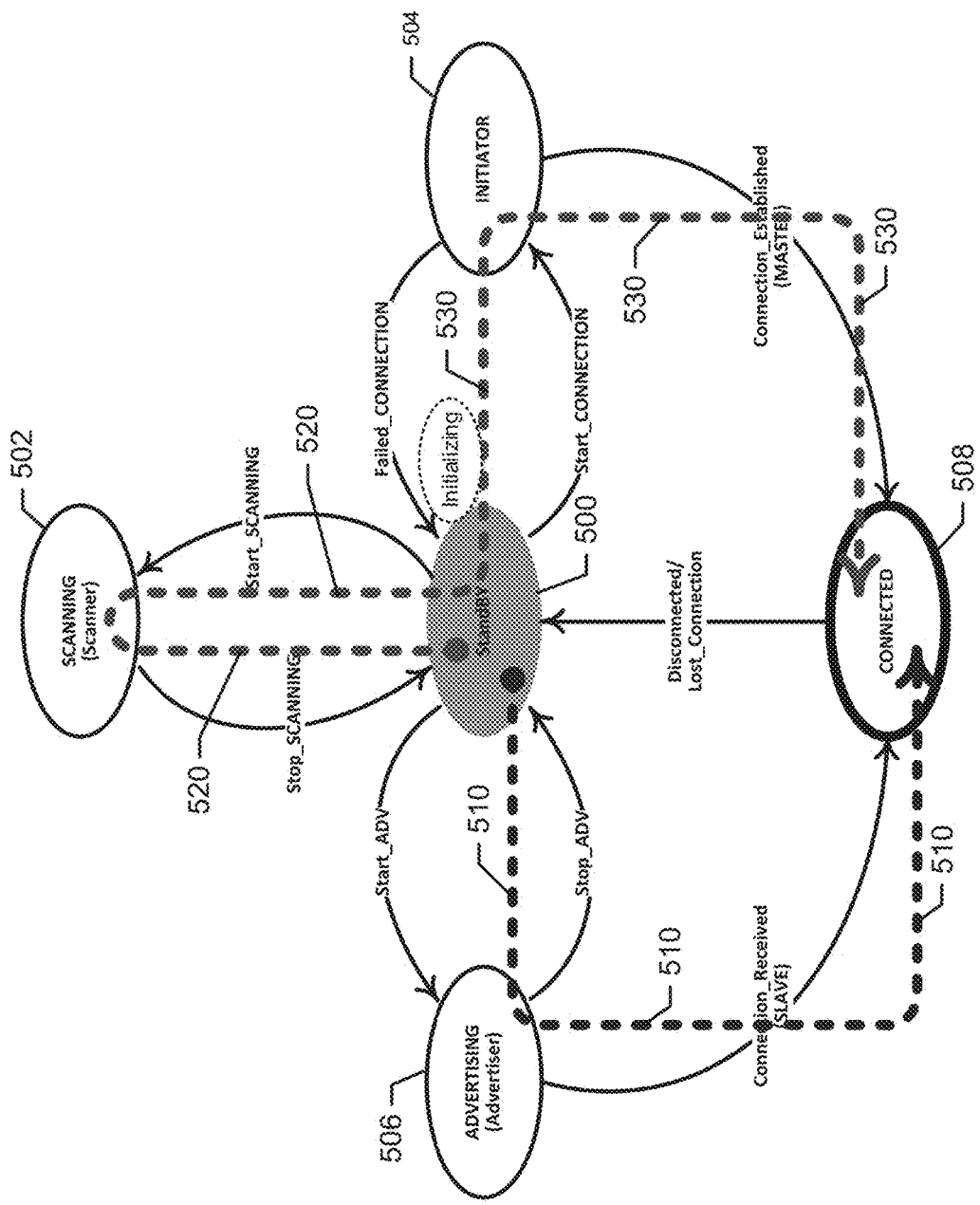
FIG. 5 is a state diagram for various operational states of Bluetooth transceivers in the user terminals and the SVDUs of the system of FIGS. 1-4 in accordance with some embodiments of the present disclosure.

FIG. 5 is a state diagram for various operational states of Bluetooth transceivers in the user terminals 200 and the SVDUs 110 of the system of FIGS. 1-4 in accordance with some embodiments of the present disclosure. Referring to FIG. 5, a Bluetooth transceiver can perform operations corresponding to the standby state 500, scanning state 502, initiator state 504, advertising state 506, and connected state 508. Depending upon congestion in the shared wireless band, a Bluetooth transceiver can frequently lose its Bluetooth connection to another device. For conventional Bluetooth transceivers that perform re-connection operations through wireless Bluetooth communications, the congested wireless band can result in unreliable communication channels and can interfere with or prevent reconnection of the Bluetooth transceivers, and increase power consumption during the reconnection attempts. In accordance with various embodiments herein, the original connection establishment and subsequent reconnection establishment operations are performed through wired communications while the wireless controllers 200 are docked in the docking stations 218. FIG. 5 illustrates the state transitions 530 of a Bluetooth transceiver operating as a master device and further illustrates the state transitions 510 of another Bluetooth transceiver operating as a slave device, according to various embodiments herein.

Figure 6:
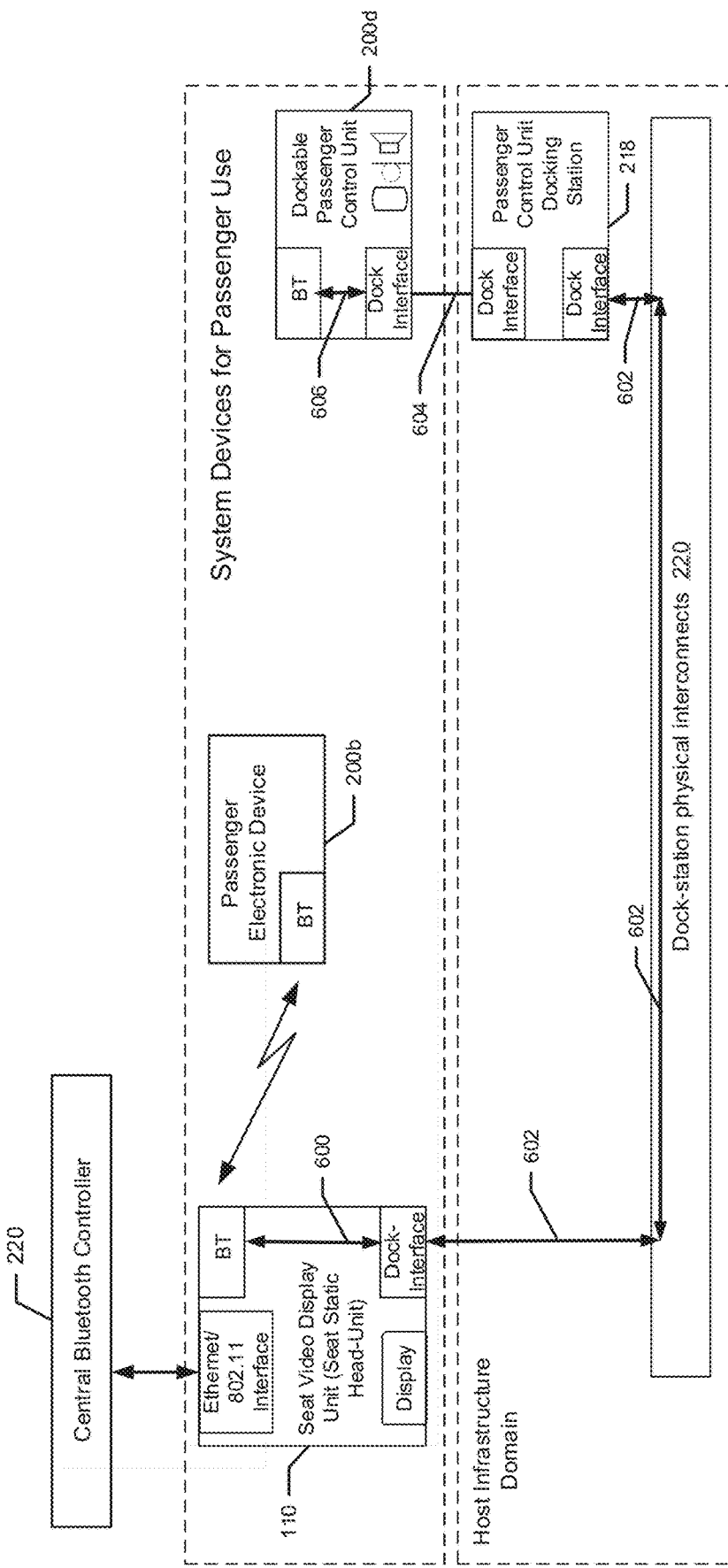
FIG. 6 is a combined block diagram and data flow diagram illustrating a central Bluetooth controller that controls establishment of a Bluetooth connection between Bluetooth transceivers in a SVDU and a dockable passenger control unit and a passenger electronic device in accordance with some embodiments of the present disclosure.

FIG. 6 is a combined block diagram and data flow diagram illustrating establishment of a connection between Bluetooth transceivers in a SVDU 110 and a dockable PCU 200d and a passenger electronic device 200b in accordance with some embodiments of the present disclosure. Referring to FIG. 6, Bluetooth connection establishment related messages between Bluetooth transceivers in the SVDU 110 and the PCU 200d are communicated through the wired dock-station physical interconnects 220 via a communication pathway segments 600, 602, 604, 606 through respective dock interfaces of the SVDU 110 and the PCU 200d, the docking station 218, and the dock-station physical interconnects 220. Once the Bluetooth wireless connection is established, further Bluetooth messages relating to maintaining Bluetooth connection are communicated through the Bluetooth transceivers and the Bluetooth wireless connection there between and, therefore, can be performed while the PCU 200d is undocked. Moreover, passenger commands that are input through the PCU 200d and/or data that is output by the SVDU 110 are communicated through the Bluetooth transceivers and the Bluetooth wireless connection there between.

The SVDU 110 responds to receiving communications from the PCU 200d via the wired network by communicating with the central Bluetooth controller 220 to control whether a Bluetooth connection is established between the Bluetooth transceiver (BT) of the SVDU 110 and the Bluetooth transceiver (BT) of the PCU 200d, and when allowed to be established to further control what security mode levels are used when establishing and using the Bluetooth connection. Similarly, the SVDU 110 responds to receiving communications from the PED 200b via the Bluetooth transceiver (BT) of the SVDU 110 by communicating with the central Bluetooth controller 220 to control whether a Bluetooth connection is established between the Bluetooth transceiver (BT) of the SVDU 110 and the Bluetooth transceiver (BT) of the PED 200b, and when allowed to be established to further control what security mode levels are used when establishing and using the Bluetooth connection.

As will be explained in further detail below, the central Bluetooth controller 220 can select an operational security level from among different levels of security operations that is to be used during establishment of a Bluetooth connection and/or during communication of data through an established Bluetooth connection, responsive to particular characteristics of the user equipment that is connected to the SVDU 110. Accordingly, the central Bluetooth controller 220 may operate to generate and maintain, within a data structure of a repository in memory, a listing of identified types of user terminals and/or identifiers of certain user terminals that are associated with different security levels of Bluetooth setup, maintenance, and/or communication encryption.

One characteristic of user terminals that may be identified and mapped by the central Bluetooth controller 220 to different security levels can include any two or more of the following: 1) Public—a user terminal that is discoverable and connectable; 2) Unknown—a user terminal that is untrusted with no previous security history known to the central Bluetooth controller 220; 3) Private—an undiscoverable user terminal that only accepts connection from known peers (its BD_ADDR is only known to the initiator device); 4) Trusted—an authenticated user terminal with link-key & marked as "trusted"; 5) Untrusted—an unauthenticated known user terminal with a link-key; 6) Trusted-Private—typical connected user terminal; 7) Black-Listed Public unconnected user terminal for which a Bluetooth connection is prohibited from being made; 8) White-Listed—Public unconnected user terminal for which a Bluetooth connection is allowed to be made; 9) Silent/Hidden/Anonymous—a hidden Unknown user terminal that promiscuously & passively snoops/sniffs/monitors traffic; 10) Clone—a user terminal that has been determined to operate by spoofing/masquerading as another user terminal; and 11) Drone—a user terminal that has been determined to operate by echoing communication traffic of another connected user terminal.

Figure 7:
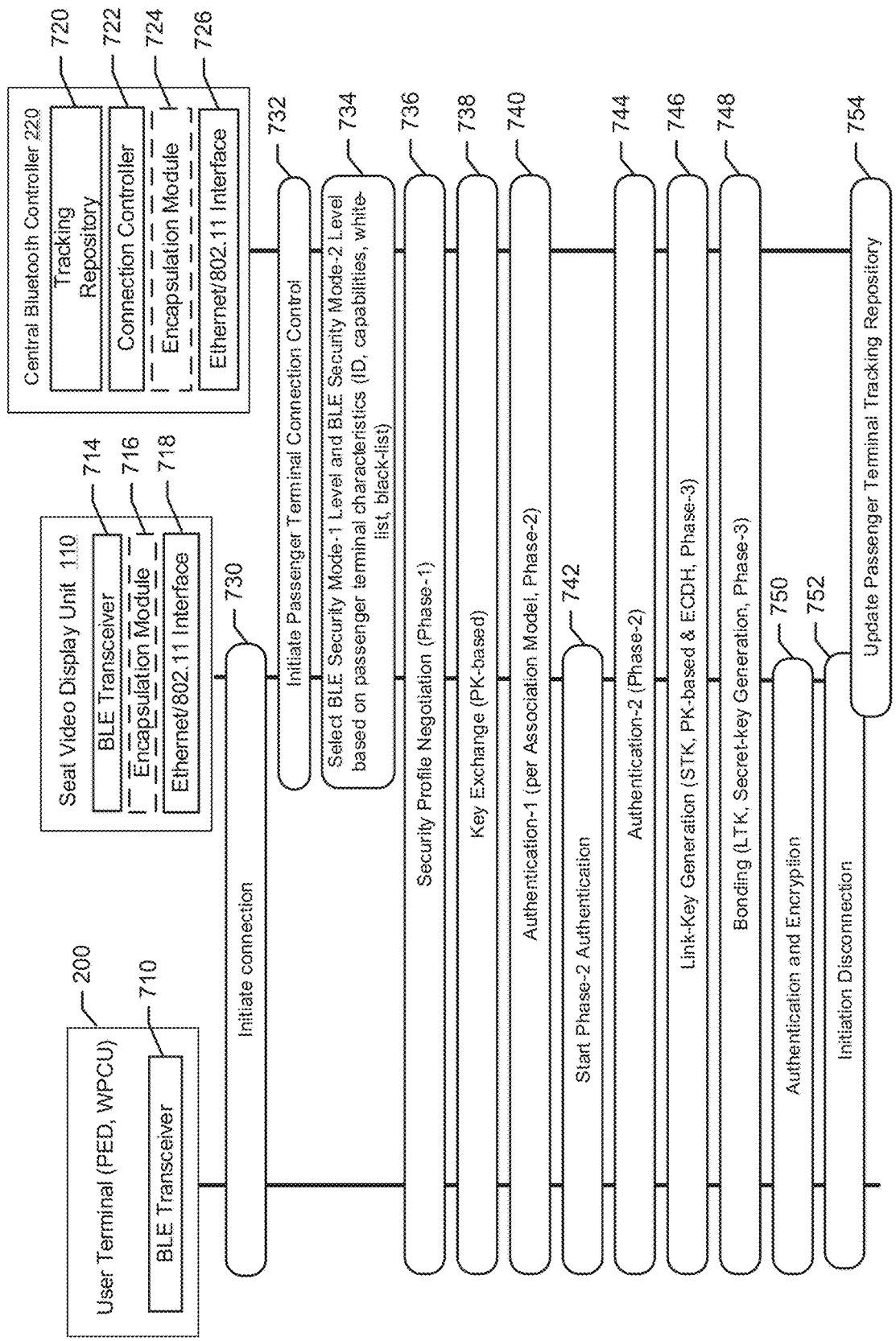
FIG. 7 is a combined block diagram and data flow diagram illustrating operations of a user terminal, a seat video display unit, and a central Bluetooth controller in accordance with some embodiments of the present disclosure.

FIG. 7 is a combined block diagram and data flow diagram illustrating operations of a user terminal 200, a SVDU 110, and a central Bluetooth controller 220 in accordance with some embodiments of the present disclosure.

Referring to FIG. 7, the user terminal 200 can include a Bluetooth low energy (BLE) transceiver 710. The SVDU 110 can similarly include a BLE transceiver 714 and an Ethernet/802.11 network interface 718. The central Bluetooth controller 220 can include a tracking repository 720, a connection controller 722, and an Ethernet/802.11 network interface 726.

The SVDU 110 may be configured to receive Bluetooth signaling through the BLE transceiver 714 from the user terminal 200, and to forward the Bluetooth signaling in an encapsulated traffic message to the central Bluetooth controller 220 for processing by the connection controller 722. The SVDU 110 may similarly receive Bluetooth signaling through the network interface 718 in an encapsulate traffic message that is generated by the connection controller 722 of the central Bluetooth controllers 220, and to forward the Bluetooth signaling to the user terminal 200 via the BLE transceiver 714. The SVDU 110 may include an encapsulation module 716 that operates to encapsulate Bluetooth signaling received from the user terminal 200 into an encapsulated traffic message that is communicated to the central Bluetooth controller 220 through the network interface 718. The central Bluetooth controller 220 can include an encapsulation module 724 that is configured to separate the Bluetooth signaling from the traffic message ("de-encapsulate") for processing by the connection controller 722, and to then encapsulate responsive Bluetooth signaling into an encapsulated traffic message that is communicated through the network interface 726 to the SVDU 110 for separation by the encapsulation module 716 and forwarding of the responsive Bluetooth signaling through the BLE transceiver 714 to the user terminal 200.

With further reference to FIG. 7, the user terminal initiates 730 a Bluetooth connection with the SVDU 110, such as by transmitting a Bluetooth connection request. The SVDU 110 responsively communicates with the central Bluetooth controller 220 to initiate control 732 by the central Bluetooth controller 720 of whether a Bluetooth connection is allowed to be established between the user terminal 200 and the SVDU 110, and/or to control what security mode level is used when establishing and using the Bluetooth connection for signaling therebetween. The central Bluetooth controller 220 selects 734 a BLE security mode-1 level from among a plurality of defined mode-1 levels and further selects a BLE security mode-2 level from among a plurality of defined mode-2 levels.

The Bluetooth security processing can include three phases: security capability exchange, link-key generation & pairing, and Short-Term-Keys generation. As will be explained in further detail below, selection of the BLE security level may be performed based on any one or more of the following: 1) whether an identifier of the user terminal 200 is among a list of trusted user terminals; 2) whether an identifier the user terminal 200 is among a list of user terminals that have previously paired with the SVDU 110 and/or with another identified SVDU; 3) whether an identifier of the user terminal 200 is among a list of user terminals for which Bluetooth connections are prohibited; 4) whether an identifier of the user terminal 200 is among a list of user terminals for which Bluetooth connections are expressly allowed; 5) an identified class of Bluetooth operational capability of the user terminal 200; 6) whether an identifier of the user terminal 200 is listed in a tracking repository as having been assigned for Bluetooth connection to the SVDU 110 (e.g., the user terminal is assigned for use with only a single identified SVDU seat location); and 7) whether the user terminal 200 is connected to the SVDU 110 through the Bluetooth transceiver 710 or through a wired network connection, e.g., via a docking station.

As will be explained in further detail below, the central Bluetooth controller 220 participates in negotiation 736 of the security profile (BLE Phase 1) between the user terminal 200 and the SVDU 110, and participates in exchange 738 of keys (PK-based) between the user terminal 200 and the SVDU 110. The central Bluetooth controller 220 then controls 740 authentication-1(pursuant to an Association model, BLE Phase-2) of the user terminal 200 by the SVDU 110. The SVDU 110 responsively starts 742 phase-two authentication of the user terminal 200, which is controlled 744 by the central Bluetooth controller 220.

The central Bluetooth controller 220 control 746 link-key generation (Short Term Key (STK), PK-based & Elliptic Curve Diffie Hellman (ECDH), BLE Phase-3) between the user terminal 200 and the SVDU 110, and controls 748 bonding (Long Term Key (LTK), secret-key generation, BLE Phase 3) between the user terminal 200 and the SVDU 110. This LTK is exchanged/generated using ECDH public key cryptography which offers significantly stronger security compared to the original BLE key exchange protocol. The SVDU 110 and the user terminal 200 then perform 750 authentication and encryption of data traffic communicated through the Bluetooth connection.

Responsive to occurrence of a defined condition, the user terminal 200 and the SVDU 110 initiate disconnection 752 of the Bluetooth connection. The SVDU 110 updates 754 the tracking repository 720 in the central Bluetooth controller 220 to indicate that the Bluetooth connection between the SVDU 110 and user terminal 200 has been disconnected.

The key exchange 738 and/or the link-key generation 746 can include one or more of the following: 1) generation of a temporary-key which is determined by security association to encrypt connection initially; 2) a Short-Term-Key (=AES128 (Temporary Key (TK), SRAND∥MRAND)) which is generated by both the user terminal 200 and the SVDU 110 for every Bluetooth connection; 3) a Long-Term-Key (=Encrypted Diversifier EDIV(DH_Key, SRAND, MRAND, MBD_ADDR, SBD_ADDR)), which is the Session-Key for Link Layer Connection; 4) Identity-Resolving-Key which is for checking random resolvable private addresses . . . , hash=AES128(IRK, PRAND), where Random_Address=[hash∥PRAND∥0b10]; and 5) a Connection- Signature-Resolving-Key which is used for authenticating a traffic message communicated through the Bluetooth connection.

Establishment of a Bluetooth connection, which can also be referred to as a pairing operations, can include use of ECDH public-key-cryptography for anonymous key agreement to prevent man-and-the-middle (MITM) snooping/spoofing and enable simpler security association models to ease user terminal and/or a SVDU user interface limitations related to user assistance with Bluetooth pairing. A numeric-comparison pairing authentication operation can include, if the user terminal 200 has a display device and at least a Yes/No key, then a N-digit random code can be used to authenticate the claimant by a user confirming the responder key. A Pass-Key-Entry pairing authentication operation can include, the SVDU 110 displaying a N-digit number and the user terminal 200 this N-digit input from the user. A just-works pairing authentication operation can include, when the user terminal 200 lacks a user interface (e.g., a wireless headset), Just-Works is used to avoid interactivity and exchanging key, however it doesn't provide protection against a man in the middle attack. An Out-of-Band (OOB) pairing authentication operation may be performed when both the user terminal—when both BT connected peers can also communicate over another channel, security exchanges can be moved to an OOB channel to minimize exposure.

As will be explained in further detail below, the central Bluetooth controller 220 can use an identified characteristic of the user terminal 200 to select a BLE security mode level from among a plurality of different BLE security mode levels which is to be used to control establishment of a Bluetooth connection and/or to control security (e.g., whether to use encryption and, if so, selecting and encryption level) when communicating data traffic through a Bluetooth connection. The BLE security protocol modes to include two or more of the following: 1) Mode-1: Open/Non-Secure—a device in this mode, can't initiate a security procedure; 2) Mode-2: Service-Level Security—after link establishment but before formation of logical channels, security exchanges protect link data but not the data transferred in channels, a device in this mode can't initiate channel-establishment & must wait for L2CAP_ConnectReq; 3) Mode-3: Link-Level Security—after a non-secure link is established, security exchanges over logical link control and adaptation protocol (L2CAP) are used for authentication, encryption, & authorization before for all connections to & from the device (even Service-Discovery) . . . , both devices in this mode must initiate security procedures before LMP_setup_complete; and 4) Mode-4: Secure-Simple-Pairing (SSP)-based Service-Level Security—similar to Mode-2 except that devices use Secure-Simple-Pairing.

Alternatively or additionally, the central Bluetooth controller 220 can use an identified characteristic of the user terminal 200 to select the BLE security mode level from among a plurality of different BLE security mode levels that include one or more of the following: BLE Security Mode-1 levels including two or more of Level-1—No Security (Open/Non-Secure)—based on blind trust & plaintext transfer; Level-2—Unauthenticated Pairing with Encryption; Level-3—Authenticated Pairing with Encryption; and Level-4—Authenticated Secure Connections with Encryption, and/or BLE Security Mode-2 levels including two or more of Level-1—Unauthenticated Pairing with Data Signing; and Level-2—Authenticated Pairing with Data Signing.

In some embodiments, the central Bluetooth controller 220 stores the short term key (STK) (e.g., generated in step 746 of FIG. 7), the long term key (LTK) (e.g., generated in step 748 of FIG. 7), and/or other information that is used to establish a Bluetooth connection between an identified user terminal and an identified SVDU in the tracking repository 720. The STK, LTK, and/or other information can be store in a data structure of the tracking repository 720 with a logical association to an identifier of the user terminal When the central Bluetooth controller 220 subsequently receives a connection request from a user terminal, it can access the data structure of the tracking repository 720 to determine whether it has information stored therein that can be used to simplify the operations for establishing a Bluetooth connection with a SVDU and, if so, can provide the information to the SVDU and/or the user terminal for use in establishing the Bluetooth connection. The central Bluetooth controller 220 may further determine whether that user terminal has a characteristic that satisfies a defined rule, based on determining, for example, that the user terminal identifier is determined to have permission to reuse such previously stored information during the connection establishing process. The rule may be satisfied when the user terminal identifier is among a listing of trusted user terminals, is associated with a defined class of Bluetooth operational capabilities (e.g., a more limited operational capability that necessitates less security operations during pairing, such as for wireless headphones), is among a listing of user terminals that have previously connected to a SVDU without causing errors or observed operational problems, etc.

The operations for simplifying establishment of a Bluetooth connection with a SVDU, can include the central Bluetooth controller 220 retrieving a key that was previously used for communication with the user terminal and which is subsequently provided to a SVDU to enable, for example, skipping one or more of steps 738, 746, and/or 748 in FIG. 7. Thus, responsive to a user terminal requesting or re-requesting a Bluetooth connection, the central Bluetooth controller 220 can retrieve information from the tracking repository 720 using the user terminal identifier as a look-up reference in the data structure to retrieve information that is reused to skip one or more steps in the operations for setting-up a Bluetooth connection between the user terminal and a SVDU. Moreover, once a user terminal is connected one SVDU within an aircraft, the information used to setup and/or maintain the Bluetooth connection may be at least partially reused to setup and/or maintain the Bluetooth connection with the same SVDU, such as when the Bluetooth connection is terminated (e.g., when the user terminal is out of range for an excessive time period) or to establish a connection to a different SVDU, such as when the user terminal is moved to another seat within the aircraft.

Moreover, the connection information may be shared between aircraft to facilitate connection of a user terminal that was connected to a SVDU during a first flight leg on a first aircraft to subsequently generate a new connection to a different SVDU on another aircraft during a second flight leg.

In one embodiment, when a wireless PCU is placed in a docking-station, the SVDU communicates with the PCU through the wired interconnection and responsively contacts the central Bluetooth controller 200, which can include an on-line central RADIUS/AAA server, to learns the connection & security history of that PCU. Whether a Bluetooth connection is allowed to be established with the PCU and, if so, what level of security is applied for authentication and/or encryption is controlled based on what information is known about the PCU. Such information may include whether the PCU is known to be prohibited from having a Bluetooth connection (blacklisted) and, in which case, a Bluetooth connection request can be can be denied. In contrast, when the information indicates that the PCU is known to be trusted or that its trust has expired, the central Bluetooth controller 220 can cause the SVDU 110 to perform operations to renew trust of the PCU, such as through operations to perform authentication of the PCU. When the information indicates that the PCU is a public device, e.g., carried onboard as a PED, the central Bluetooth controller 220 can cause the SVDU 110 to perform operations to generate a new security association, and a result of the security association can be stored in the tracking repository 720 for future reference when an identifier of the user terminal is later received in another Bluetooth connection request.

Because the central Bluetooth controller 220 is connected to all of the SVDUs 110, once the decision has been made as to the connection authorization and connection security level for a particular identified user terminal attempting Bluetooth connection to one of the SVDUs 110, the generated connection authorization decision by the central Bluetooth controller 220 can be stored in the tracking repository 720 and at least partially reused during processing of another Bluetooth connection request which is subsequently received from that same user terminal at another SVDU 110. Moreover, the central Bluetooth controller 220 may be connected through a ground data link, satellite data link, and/or air-to-air data link to other aircraft to share content of the tracking repository 720, including information relating to connection authorization decisions for a list of identifiers of user equipment, with the central Bluetooth controllers 220 on other aircraft. In this manner, the central Bluetooth controller 220 may operate as a shared informational database that extends across multiple aircraft. Although embodiments of the central Bluetooth controller 220 have been disclosed herein as possibly residing on the same aircraft as the SVDUs to which it is connected, in some other embodiments the central Bluetooth controller 220 resides on a ground-based server which is connected through a ground data link and/or satellite data link to the aircraft.

Figure 8:
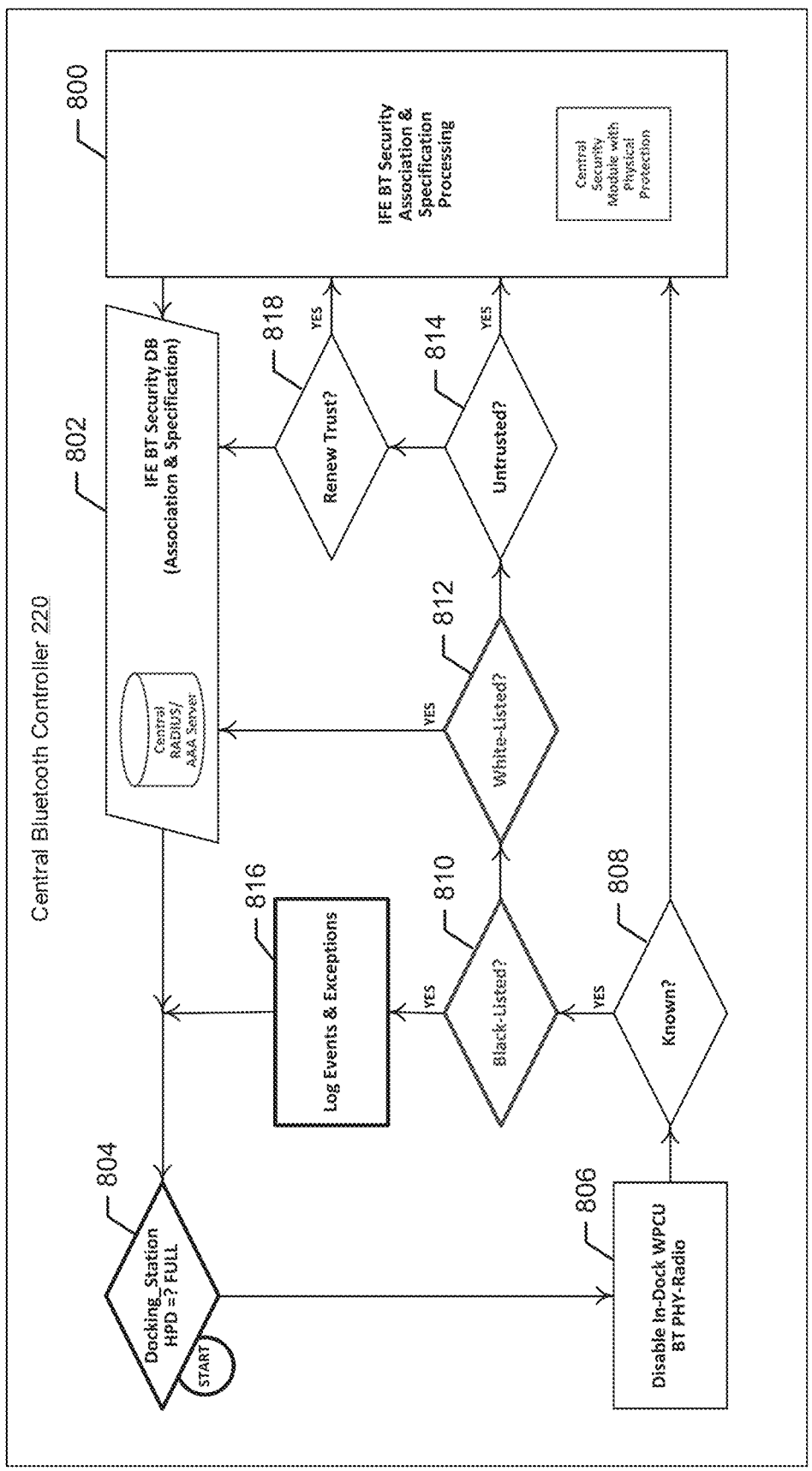
FIG. 8 is a flowchart of operations by the central Bluetooth controller in accordance with some embodiments of the present disclosure.

FIG. 8 is a flowchart of operations by the central Bluetooth controller 220 in accordance with some embodiments of the present disclosure. Referring to FIG. 8, an IFE Bluetooth security association and specification processing operation 800 can include a central security module with physical protection. An IFE Bluetooth security database can define associations and specification of Bluetooth devices and associated security levels. The database may include a central RADIUS/AAA server.

A decision 804 is made whether the user terminal resides in a docking station. Responsive to the user terminal residing in the docking station, the central Bluetooth controller 220 signals the user terminal to disable transmission of Bluetooth signaling through its Bluetooth transceiver, and trigger the user terminal to route the Bluetooth signaling through the docking station and the wired network connection to the SVDU and, therethrough, to the central Bluetooth controller 220. The central Bluetooth controller 220 determines 808 whether the identifier of the user terminal, which is provided in the Bluetooth signaling, is known by being among a list residing in the tracking repository 720.

When the user terminal identifier is known, a further determination is made whether the user terminal is blacklisted by being among a list of user terminals for which Bluetooth connections to SVDUs are prohibited. When blacklisted, the central Bluetooth controller 220 can responsively communicate a connection authorization response to the SVDU 110 that contains information indicating that a Bluetooth connection is prohibited, and can update 816 a log event and exceptions data structure in the tracking repository 720.

If the user terminal is not blacklisted, a further determination 812 is performed whether the user terminal is white listed by being identified is among a list of user terminals which Bluetooth connections SVDUs are allowed. The central Bluetooth controller 220 can respond to a white listing determination by selecting a Bluetooth security mode level that is to be used to control authentication of the user terminal during establishment of a Bluetooth connection and/or used to control a level of encryption that is performed on data traffic for communication through the Bluetooth connection.

If the user terminal is not white listed, a further determination 814 is made whether the user terminal is untrusted and, if so, further Bluetooth security association and processing 800 is performed to authenticate the user terminal and control establishment of the Bluetooth connection between the SVDU and the user terminal and control whether and what level of encryption is applied to data traffic communicated through the Bluetooth connection. In contrast, when the user terminal is determined to be trusted, a determination 818 is made whether the trust has expired and, if so, operations are performed to renew trust of the user terminal, such as by triggering the SVDU to perform authentication operations on the user terminal.

Other operations that may be performed by a user terminal, a seat video display unit and a central Bluetooth controller to determine whether a Bluetooth connection is authorized and, if so, to control which security operations are used during establishment of the Bluetooth connection and what level of security, e.g., encryption, is used during communication of data traffic through the Bluetooth connection. These operations are described in the context of FIG. 9, which is a combined block diagram and data flow diagram illustrating operations by a user terminal 200, a seat video display unit 110, and a central Bluetooth controller 220.

Figure 9:
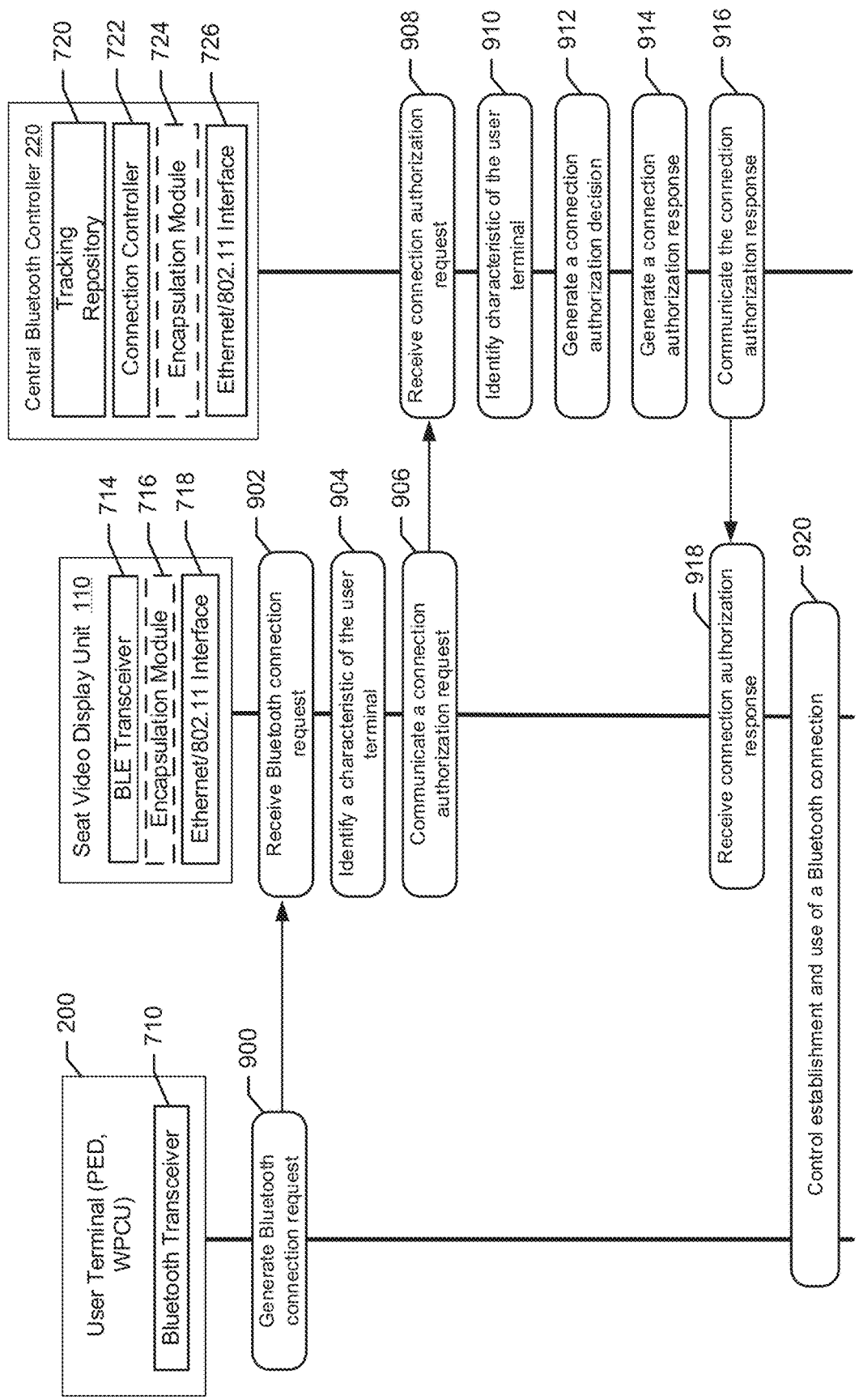
FIG. 9 is a combined block diagram and data flow diagram illustrating operations of a user terminal, a seat video display unit, and a central Bluetooth controller in accordance with some embodiments of the present disclosure.

Referring to FIG. 9, the user terminal may be a PED, a wireless PCU, or other wireless communication device that is configured to communicate by Bluetooth signaling. The user terminal 200 includes a Bluetooth transceiver 710 which controls the communication protocol and performs encoding and decoding of transmissions.

The SVDU 110 includes a network interface 718 and a Bluetooth transceiver 714 which can include one or more processor circuits ("processor") connected to non-transitory memory devices storing program code that is executed by the processor to perform operations. The SVDU 110 may further include an encapsulation module 716 that encapsulates Bluetooth signaling received from the user terminal 200, such as received through a wired connection, e.g., via a docking station, and/or via the Bluetooth transceiver 714, into an encapsulated traffic message for communication to the central Bluetooth controller 220. The encapsulation module 716 can also de-encapsulate a responsive traffic message received from the central Bluetooth controller 220 to remove responsive Bluetooth signaling that was encapsulated therein, for communication to the user terminal 200 through the wired connection and/or through the Bluetooth transceiver 714. The network interface 718 may include an Ethernet and/or Wi-Fi 802.11 communication interface. The Bluetooth transceiver 714 is configured to communicate through Bluetooth signaling with the user terminal 200.

The central Bluetooth controller 220 includes a tracking repository 720, a connection controller 722, and a network interface 726 that may be an Ethernet and/or Wi-Fi 802.11 communication interface. The central Bluetooth controller 220 may further include an encapsulation module 724 that operates in concert with the encapsulation module 716 of the SVDU 110 to separate for processing encapsulated Bluetooth signaling witches received in a encapsulated traffic message from the SVDU 110, and two encapsulate responsive Bluetooth signaling into encapsulate traffic message that is communicated to the SVDU 110.

The user terminal 200 generates 900 a Bluetooth connection request that is communicated through the Bluetooth transceiver 710 and/or through a wired connection to the SVDU 110 for corresponding reception by the Bluetooth transceiver 714 and/or a wired interface, e.g., network interface 718. The SVDU 110 receives 902 the Bluetooth connection request, and identifies a characteristic of the user terminal 200 based on the Bluetooth connection request. The SVDU 110 communicates 906 a connection authorization request through the network interface 718. The connection authorization request contains an indication of the characteristic of the user terminal 200.

The central Bluetooth controller 220 receives 908 the connection authorization request from the SVDU 110 through the network interface 726, and identifies 910 a characteristic of the user terminal 200 based on the indication contained in the connection authorization request. Central Bluetooth controller 220 generates 912 a connection authorization decision based on application of a Bluetooth connection rule to the characteristic of the user terminal, and then generates 914 a connection authorization response containing an indication of the connection authorization decision. The central Bluetooth controller 220 communicates 916 the connection authorization response through the network interface 726 to the SVDU 110.

The SVDU 110 receives 918 the connection authorization response through the network interface 718, and then communicates with the user terminal 200 to control 920 establishment of a Bluetooth connection through the Bluetooth transceiver 714 with the user terminal 200 responsive to content of the connection authorization response. When a Bluetooth connection is established, the SVDU 110 can display information that is received from the user terminal 200 through the Bluetooth connection on a video display device (1060 FIG. 10).

In some embodiments, the operations for generating 912 the connection authorization decision, include selecting a Bluetooth security mode from among a plurality of defined Bluetooth security modes, which may be defined in the tracking repository 720, based on the characteristic of the user terminal 200 indicated by the connection authorization request. The connection authorization decision is then generated to indicate the selected Bluetooth security.

The Bluetooth security mode may be selected based on determining a class of Bluetooth operational capability of the user terminal 200. In one embodiment, a class of Bluetooth operational capability of the user terminal 200 is identified based on the characteristic of the user terminal 200 indicated by the connection authorization request. The central Bluetooth controller 220 selects the Bluetooth security mode from among the plurality of defined Bluetooth security modes based on the class of Bluetooth operational capability that is identified.

The class of Bluetooth operational capability may be determined based on what type of traffic it will transmit and/or receive through the Bluetooth connection, what type of resources of the SVDU 110 it will seek to access through the Bluetooth connection, whether it supports encryption of data traffic communicated through the Bluetooth connection and if so what level of encryption it supports, what level of data security operations it supports during establishment of a Bluetooth connection, whether it has a user interface and if so what type of user interface and (e.g., is the user terminal 200 is a wireless headphone having no user interface other than a speaker to play audio received from another device), and/or other identifiable characteristics of the user terminal.

In a further embodiment, the central Bluetooth controller 220 may operate to associate, in a data structure within the tracking repository 720, different classes of Bluetooth operational capabilities with different ones of a plurality of BLE security mode-1 levels that can include:

1. Level-1 having no authentication performed during pairing connection between the user terminal and the video display unit and no encryption of communications therebetween through a paired connected;
2. Level-2 having no authentication performed during pairing connection between the user terminal and the video display unit and having encryption of communications therebetween through a paired connected; and
3. Level-3 having authentication performed during pairing connection between the user terminal and the video display unit and having encryption of communications therebetween through a paired connected.

The central Bluetooth controller 220 can select a BLE security mode-1 level from among the plurality of BLE security mode-1 levels that is associated with the identified class of Bluetooth access privilege.

In another embodiment, the central Bluetooth controller 220 selects different Bluetooth security modes for use in establishing a Bluetooth connection based on whether the Bluetooth connection request was received through Bluetooth air-interface transmissions or through a wired connection to the user terminal 200. The operations for selecting the Bluetooth security mode can include determining whether the Bluetooth connection request was received from the user terminal 200 through the Bluetooth transceiver 714 of the SVDU 110 or through a wired network connected to the network interface 718 of the SVDU 110. Responsive to determining that the Bluetooth connection request was received through the Bluetooth transceiver 714, the central Bluetooth controller 220 selects a first Bluetooth security mode from among the plurality of defined Bluetooth security modes that provides a first level of Bluetooth security pairing with the user terminal 200. In contrast, responsive to determining that the Bluetooth connection request was received through the network interface 718, the central Bluetooth controller 220 selects a second Bluetooth security mode from among the plurality of defined Bluetooth security modes that provides a second level of Bluetooth security pairing with the user terminal 200 that is less secure than the first level of Bluetooth security pairing.

In another embodiment, the central Bluetooth controller selects different Bluetooth security modes based on whether the user terminal 200 is determined to be among a list of trusted user terminals identified in the tracking repository 720. The operations for selecting the Bluetooth security mode can include maintaining in the tracking repository 720 a list of identifiers of trusted user terminals. The central Bluetooth controller 220 determines an identifier of the user terminal 200 based on the characteristic indicated by the connection authorization request. Responsive to the identifier of the user terminal 200 being determined to be among the list of identifiers of trusted user terminals maintained by the tracking repository 720, the central Bluetooth controller 220 selects a first Bluetooth security mode from among the plurality of defined Bluetooth security modes that triggers the Bluetooth transceiver 714 of the SVDU 110 to perform authentication of the user terminal 200 during establishment of a paired connection with the user terminal 200 and to then not encrypt data that is subsequently communicated through the paired connection. In contrast, responsive to the identifier of the user terminal 200 being determined to not be among the list of identifiers of trusted user terminals maintained by the tracking repository, the central Bluetooth controller 220 selects a second Bluetooth security mode from among the plurality of defined Bluetooth security modes that triggers the Bluetooth transceiver 714 of the SVDU 110 to perform authentication of the user terminal 200 during establishment of a paired connection with the user terminal 200 and to then encrypt data that is subsequently communicated through the paired connection.

In a further related embodiment, the operation for determining which one of the Bluetooth security modes is selected by the central Bluetooth controller 220 is influenced based on whether the user terminal 200 is determined to have been allowed to previously pair with one of the SVDUs 110 within the same aircraft, or within another aircraft such as when the information contained in the tracking repository 720 is shared between aircraft IFE systems. The operation for generating the connection authorization decision can include maintaining in the tracking repository 720 a list of identifiers of user terminals that have been previously paired with one of the SVDUs 110. Responsive to the identifier of the user terminal 200 being determined to not be among the list of identifiers of trusted user terminals and being further determined to not be among the list of identifiers of user terminals that have been previously paired with one of the SVDUs 110, the central Bluetooth controller 220 selects a third Bluetooth security mode from among the plurality of defined Bluetooth security modes that triggers the Bluetooth transceiver 714 of the SVDU 110 to perform authentication of the user terminal 200 during establishment of a paired connection with the user terminal 200 and to then encrypt data that is subsequently communicated through the paired connection using a greater strength of encryption relative to a strength of encryption that is used for the second Bluetooth security mode.

In another embodiment, the central Bluetooth controller 220 maintains a list of prohibited user terminals, and controls whether a user terminals allowed to establish a connection to a one of the SVDUs 110 based on whether it's terminal ID is among the listing of terminal IDs having a prohibited designation. The operations for generating the connection authorization decision can include maintaining in the tracking repository 720 a list of identifiers of prohibited user terminals. The central Bluetooth controller 220 determines an identifier of the user terminal 200 based on the characteristic indicated by the connection authorization request. Responsive to the identifier of the user terminal 200 being determined to be among the list of identifiers of prohibited user terminals, the central Bluetooth controller 220 configures the connection authorization decision within the connection authorization response to trigger the Bluetooth transceiver 714 of the SVDU 110 to prevent establishment of a paired connection with the user terminal 200. In contrast, responsive to the identifier of the user terminal 200 being determined to not be among the list of identifiers of prohibited user terminals, the central Bluetooth controller 220 selects a Bluetooth security mode from among a plurality of defined Bluetooth security modes and configures the connection authorization decision within the connection authorization response to indicate the selected Bluetooth security mode.

In another embodiment, the central Bluetooth controller 220 locks a user terminal 200 to being used with a particular seat. For example, a PCU that is supplied by an airline can be assigned for use with a particular seat or to a particular group of seats (e.g., business class) and prohibited from being used with SVDUs at other seats. The central Bluetooth controller 220 enforces the seat locking operation by allowing that PCU to only establish a Bluetooth connection with the particular SVDU 110 servicing that seat or to the particular group of SVDUs servicing that group of seats. When the central Bluetooth controller 220 determines that the PCU is being used to attempt to establish a Bluetooth connection to another SVDU (one to which it is not assigned) or to connection to an SVDU that is not within the group of allowed SVDUs, the central Bluetooth controller 220 can prevent establishment of the Bluetooth connection and may communicate a message to the other SVDU for display to a passenger crew member indicating which seat or group of seats the PCU is allowed to be used with.

Corresponding operations for generating the connection authorization decision based on application of the Bluetooth connection rule to the characteristic of the user terminal, can include maintaining in the tracking repository 720 a list identifying which identifiers of user terminals have been assigned for Bluetooth connection to which identifiers of the SVDUs 110. The central Bluetooth controller 220 determines an identifier of the user terminal 200 and an identifier of the SVDU 110 based on the characteristic indicated by the connection authorization request. Responsive to determining that the identifier of the user terminal 200 is not identified in the list as being assigned for Bluetooth connection with the identifier of the SVDU 110, the central Bluetooth controller 220 configures the connection authorization decision within the connection authorization response to trigger the Bluetooth transceiver 714 of the SVDU 110 to prevent establishment of a paired connection with the user terminal 200. In contrast, responsive to determining that the identifier of the user terminal 200 is identified in the list as being assigned for Bluetooth connection with the identifier of the SVDU 110, the central Bluetooth controller 220 selects a Bluetooth security mode from among a plurality of defined Bluetooth security modes and configures the connection authorization decision within the connection authorization response to indicate the selected Bluetooth security mode.

As explained above, information contained in the tracking repository 720 may be shared with IFE, systems in other aircraft through a ground data link, satellite data link, and/or air-to-air data link. In this manner, the central Bluetooth controller 220 may operate as a shared informational database that extends across multiple aircraft. Although embodiments of the central Bluetooth controller 220 have been disclosed herein as possibly residing on the same aircraft as the SVDUs to which it is connected, in some other embodiments the central Bluetooth controller 220 resides on a ground-based server which is connected through a ground data link and/or satellite data link to the aircraft.

As explained above, the SVDU 110 may relay Bluetooth signaling that is received from a user terminal to the central Bluetooth controller 220. Bluetooth signaling may be relayed without modification or without substantial modification, by encapsulating content of the Bluetooth signaling into encapsulate transport messages that are communicated through the network interface 718 to the central Bluetooth controller 224 processing. Accordingly, some of the Bluetooth operational processing that would normally be performed by the Bluetooth transceiver 714 and the SVDU 110 may instead be performed by the connection controller 722 or other Bluetooth processing module of the central Bluetooth controller 220.

Accordingly, a processor of the SVDU 110 can perform operations to encapsulate Bluetooth signaling into transport messages, which are also referred to as encapsulate transport messages, responsive to the Bluetooth signaling being received from the user terminal 200 through the Bluetooth transceiver 714 and determined to relate to establishing a Bluetooth connection with the user terminal 200. Encapsulation Bluetooth signaling may include encapsulating Media Access Control (MAC) commands, which are received from the user terminal 200 and determined to relate to establishing the Bluetooth connection, into the transport messages. The SVDU 110 communicates the transport messages to the central Bluetooth controller 220 through the network interface 718, and receives responsive transport messages from the central Bluetooth controller 220 through the network interface 718. The processor of the SVDU 110 de-encapsulates the responsive transport message to obtain Bluetooth signaling generated by the central Bluetooth controller 220, and operates to transmit the obtained Bluetooth signaling through the Bluetooth transceiver 714 to the user terminal 200.

The processor of each of the SVDUs 110 may be further configured to only encapsulate into transport messages Bluetooth signaling which is received from the user terminal 200 through the Bluetooth transceiver 714 and determined to relate to establishing a Bluetooth connection with the user terminal 200. Accordingly, Bluetooth signaling that is received from the user terminal 200 through the Bluetooth transceiver 714 which is determined to relate to data traffic communicated through an already established Bluetooth connection, is not encapsulated and forwarded to the central Bluetooth controller 220. This operation enables the central Bluetooth controller 220 to receive and responsively operate based on Bluetooth signaling from the user terminal 200 that relates to establishing a Bluetooth connection, while not being burdened with receiving other Bluetooth signaling that is not related to establishing a Bluetooth connection with the user terminal 200.

Example Display Unit and Wireless Controller

Figure 10:
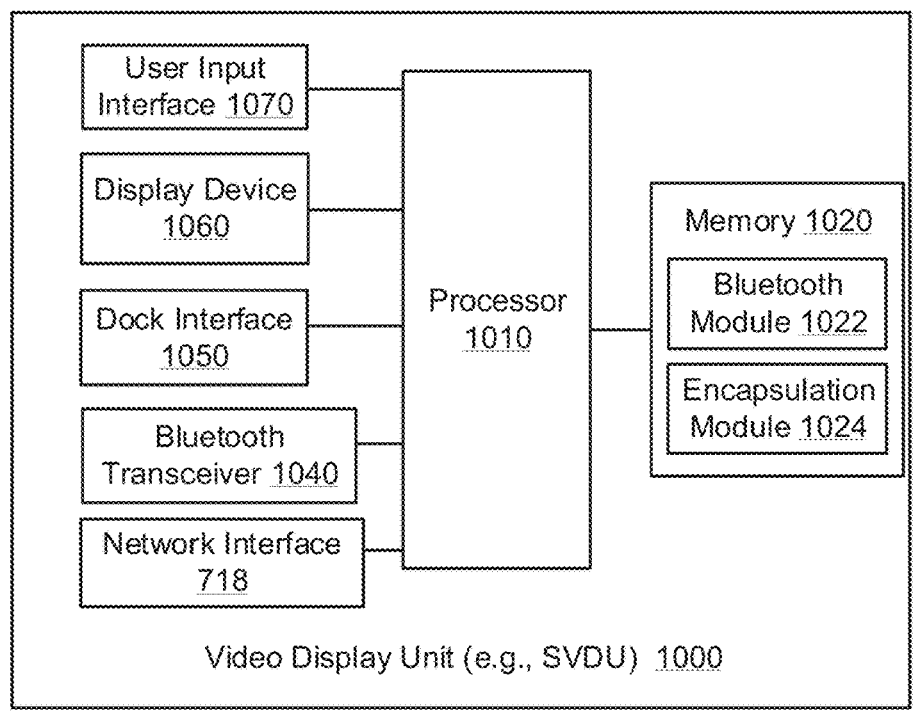
FIG. 10 is a block diagram of a video display unit configured to operate in accordance with some embodiments of the present disclosure.

FIG. 10 is a block diagram of a video display unit 1000, such as the SVDU 110, that is configured to operate in accordance with some embodiments of the present disclosure. The video display unit includes a dock interface 1050, a Bluetooth transceiver 1040, a processor 1010, a memory 1020, the network interface 718, and a display device 1060 (e.g., graphical display device that may include a touch sensitive display). The video display unit 1000 may further include a user input interface 1070 (e.g., keypad, buttons, touch sensitive interface, etc.), The processor 1010 may include one or more data processing circuits, such as a general purpose and/or special purpose processor (e.g., microprocessor and/or digital signal processor) that may be collocated or distributed across one or more networks. The processor 1010 is configured to execute computer program code in the memory 1020, described below as a non-transitory computer readable medium, to perform at least some of the operations described herein as being performed by an access control computer. The computer program code can include the Bluetooth module 1022 and the encapsulation module 1024. The computer program code when executed by the processor 1010 causes the processor 1010 to perform operations in accordance with one or more embodiments disclosed herein for the SVDUs and other display units disclosed herein. The processor 1010 controls what content is played (e.g., television shows, movies), displayed (e.g., electronic books), executed (e.g., gaming programs), and/or otherwise consumed through the display unit responsive to commands received through the Bluetooth transceiver 1040 from a user terminal.

Figure 11:
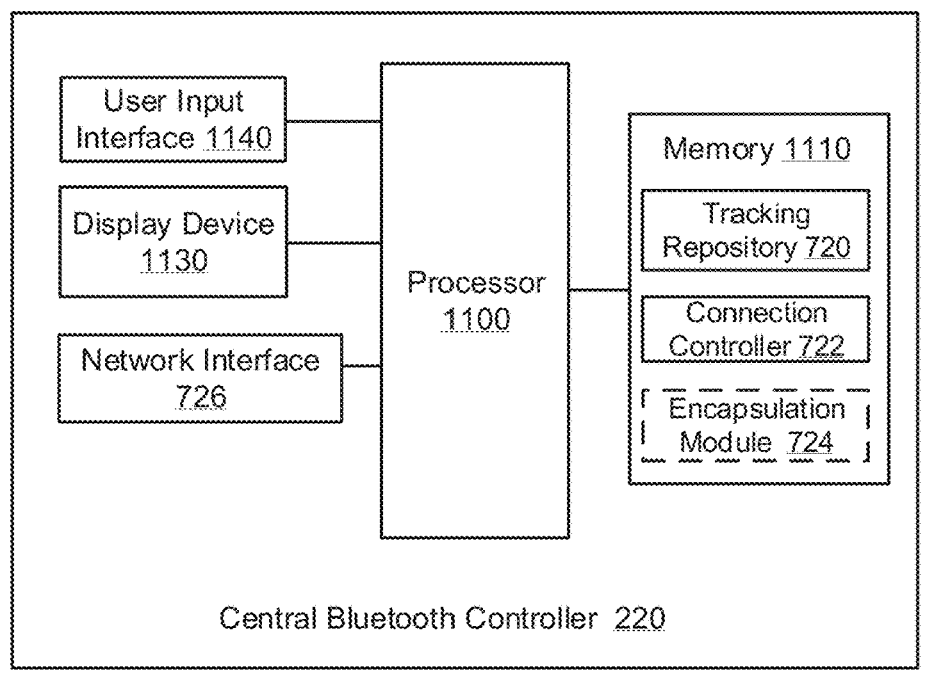
FIG. 11 is a block diagram of a central Bluetooth controller configured to operate in accordance with some embodiments of the present disclosure.

FIG. 11 is a block diagram of a central Bluetooth controller 220 configured to operate in accordance with some embodiments of the present disclosure. The central Bluetooth controller 220 includes a processor 1100, a memory 1110, and a network interface 726. The central Bluetooth controller 220 may further include a user input interface 1070 (e.g., keypad, buttons, touch sensitive interface, etc.) and a display device 1060 (e.g., graphical display device, LED indicators, etc.).

The processor 1100 may include one or more data processing circuits, such as a general purpose and/or special purpose processor (e.g., microprocessor and/or digital signal processor) that may be collocated or distributed across one or more networks. The processor 1100 is configured to execute computer program code in the memory 1110, described below as a non-transitory computer readable medium, to perform at least some of the operations described herein as being performed by an access control computer. The computer program code can include code that generates maintains the tracking repository 720, a connection controller 722, and may further include encapsulation module 724. The computer program code when executed by the processor 1100 causes the processor 1100 to perform operations in accordance with one or more embodiments disclosed herein for the central Bluetooth controllers disclosed herein.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An entertainment system comprising:
a plurality of video display units each comprising:
  a network interface;
  a Bluetooth transceiver configured to communicate through Bluetooth signaling with user terminals;
  a video display device; and
  a processor configured to:
    receive a Bluetooth connection request from a user terminal;
    identify a characteristic of the user terminal based on the Bluetooth connection request;
    communicate a connection authorization request through the network interface of the video display unit, the connection authorization request containing an indication of the characteristic of the user terminal;
    receive a connection authorization response through the network interface of the video display unit;
    control establishment of a Bluetooth connection through the Bluetooth transceiver with the user terminal responsive to content of the connection authorization response; and
    when a Bluetooth connection is established, display information that is received from the user terminal through the Bluetooth connection on the video display device; and
a central Bluetooth controller comprising:
  a network interface configured to communicate with the network interfaces of the video display units; and
  a processor configured to control establishment of Bluetooth connections between user terminals and the video display units by operations comprising:
    receiving the connection authorization request from one of the video display units through the network interface of the central Bluetooth controller;
    identifying the characteristic of a user terminal based on the indication contained in the connection authorization request;
    generating a connection authorization decision based on application of a Bluetooth connection rule to the characteristic of the user terminal;
    generating a connection authorization response containing an indication of the connection authorization decision; and
    communicating the connection authorization response through the network interface to the one of the video display units.

2. The entertainment system of claim 1, wherein the operation for generating the connection authorization decision based on application of the Bluetooth connection rule to the characteristic of the user terminal, comprises:
selecting a Bluetooth security mode from among a plurality of defined Bluetooth security modes based on the characteristic of the user terminal indicated by the connection authorization request; and
generating the connection authorization decision to indicate the selected Bluetooth security mode.

3. The entertainment system of claim 2, wherein the operation for selecting the Bluetooth security mode comprises:
identifying a class of Bluetooth operational capability of the user terminal based on the characteristic of the user terminal indicated by the connection authorization request; and
selecting the Bluetooth security mode from among the plurality of defined Bluetooth security modes based on the class of Bluetooth operational capability that is identified.

4. The entertainment system of claim 3, wherein the selection of the Bluetooth security mode from among the plurality of defined Bluetooth security modes comprises:
associating different classes of Bluetooth operational capabilities with different ones of a plurality of BLE security mode-1 levels that comprise:
  Level-1 having no authentication performed during pairing connection between the user terminal and the video display unit and no encryption of communications therebetween through a paired connected;
  Level-2 having no authentication performed during pairing connection between the user terminal and the video display unit and having encryption of communications therebetween through a paired connected; and
  Level-3 having authentication performed during pairing connection between the user terminal and the video display unit and having encryption of communications therebetween through a paired connected; and
selecting a BLE security mode-1 level from among the plurality of BLE security mode-1 levels that is associated with the identified class of Bluetooth access privilege.

5. The entertainment system of claim 2, wherein the operation for selecting the Bluetooth security mode comprises:
determining whether the Bluetooth connection request was received from the user terminal through the Bluetooth transceiver of the video display unit or through a wired network connected to the network interface of the video display unit;
responsive to determining that the Bluetooth connection request was received through the Bluetooth transceiver of the video display unit, selecting a first Bluetooth security mode from among the plurality of defined Bluetooth security modes that provides a first level of Bluetooth security pairing with the user terminal; and
responsive to determining that the Bluetooth connection request was received through the network interface of the video display unit, selecting a second Bluetooth security mode from among the plurality of defined Bluetooth security modes that provides a second level of Bluetooth security pairing with the user terminal that is less secure than the first level of Bluetooth security pairing.

6. The entertainment system of claim 2, wherein the operation for selecting the Bluetooth security mode comprises:
maintaining in a tracking repository a list of identifiers of trusted user terminals;
determining an identifier of the user terminal based on the characteristic indicated by the connection authorization request;
responsive to the identifier of the user terminal being determined to be among the list of identifiers of trusted user terminals maintained by the tracking repository, selecting a first Bluetooth security mode from among the plurality of defined Bluetooth security modes that triggers the Bluetooth transceiver of the video display unit to perform authentication of the user terminal during establishment of a paired connection with the user terminal and to then not encrypt data that is subsequently communicated through the paired connection; and responsive to the identifier of the user terminal being determined to not be among the list of identifiers of trusted user terminals maintained by the tracking repository, selecting a second Bluetooth security mode from among the plurality of defined Bluetooth security modes that triggers the Bluetooth transceiver of the video display unit to perform authentication of the user terminal during establishment of a paired connection with the user terminal and to then encrypt data that is subsequently communicated through the paired connection.

7. The entertainment system of claim 6, wherein the operation for generating the connection authorization decision based on application of the Bluetooth connection rule to the characteristic of the user terminal, further comprises:

maintaining in the tracking repository a list of identifiers of user terminals that have been previously paired with one of the video display units;

responsive to the identifier of the user terminal being determined to not be among the list of identifiers of trusted user terminals and being further determined to not be among the list of identifiers of user terminals that have been previously paired with one of the video display units, selecting a third Bluetooth security mode from among the plurality of defined Bluetooth security modes that triggers the Bluetooth transceiver of the video display unit to perform authentication of the user terminal during establishment of a paired connection with the user terminal and to then encrypt data that is subsequently communicated through the paired connection using a greater strength of encryption relative to a strength of encryption that is used for the second Bluetooth security mode.

8. The entertainment system of claim 1, wherein the operation for generating the connection authorization decision based on application of the Bluetooth connection rule to the characteristic of the user terminal, comprises:

maintaining in a tracking repository a list of identifiers of prohibited user terminals;

determining an identifier of the user terminal based on the characteristic indicated by the connection authorization request;

responsive to the identifier of the user terminal being determined to be among the list of identifiers of prohibited user terminals, configuring the connection authorization decision within the connection authorization response to trigger the Bluetooth transceiver of the video display unit to prevent establishment of a paired connection with the user terminal; and responsive to the identifier of the user terminal being determined to not be among the list of identifiers of prohibited user terminals, selecting a Bluetooth security mode from among a plurality of defined Bluetooth security modes and configuring the connection authorization response to indicate the selected Bluetooth security mode.

9. The entertainment system of claim 1, wherein the operation for generating the connection authorization decision based on application of the Bluetooth connection rule to the characteristic of the user terminal, comprises:

maintaining in a tracking repository a list identifying which identifiers of user terminals have been assigned for Bluetooth connection to which identifiers of video display units;

determining an identifier of the user terminal and an identifier of the video display unit based on the characteristic indicated by the connection authorization request;

responsive to determining that the identifier of the user terminal is not identified in the list as being assigned for Bluetooth connection with the identifier of the video display unit, configuring the connection authorization decision within the connection authorization response to trigger the Bluetooth transceiver of the video display unit to prevent establishment of a paired connection with the user terminal; and responsive to determining that the identifier of the user terminal is identified in the list as being assigned for Bluetooth connection with the identifier of the video display unit, selecting a Bluetooth security mode from among a plurality of defined Bluetooth security modes and configuring the connection authorization decision within the connection authorization response to indicate the selected Bluetooth security mode.

10. The entertainment system of claim 1, wherein the processor of each of the video display units is further configured to:

encapsulate Bluetooth signaling into transport messages responsive to the Bluetooth signaling being received from a user terminal through the Bluetooth transceiver of the video display unit and determined to relate to establishing a Bluetooth connection with the user terminal;

communicate the transport messages to the central Bluetooth controller through the network interface of the video display unit;

receive responsive transport messages from the central Bluetooth controller through the network interface of the video display unit;

de-encapsulate the responsive transport message to obtain Bluetooth signaling generated by the central Bluetooth controller; and transmit the obtained Bluetooth signaling through the Bluetooth transceiver of the video display unit to the user terminal.

11. The entertainment system of claim 10, wherein the processor of each of the video display units is further configured to:

only encapsulate into transport messages Bluetooth signaling which is received from the user terminal through the Bluetooth transceiver of the video display unit and determined to relate to establishing a Bluetooth connection with the user terminal.

12. The entertainment system of claim 10, wherein the processor of each of the video display units is further configured to:

encapsulate Media Access Control (MAC) commands received from the user terminal and related to establishing the Bluetooth connection, into the transport messages.

13. The entertainment system of claim 1, wherein:

the video display units are configured to be connected to structure of passenger seats that are spaced apart within a vehicle; and the network interfaces of the video display units are communicatively connected to the network interface of the central Bluetooth controller through at least one of a wired Ethernet network and a wireless WiFi access point device.

14. A central Bluetooth controller comprising:
a network interface configured to communicate with video display units; and
a processor configured to control establishment of Bluetooth connections between user terminals and video display units by operations comprising:
  receiving a connection authorization request through the network interface, the connection authorization request containing an indication of a characteristic of a user terminal that is communicating with one of the video display units;
  identifying the characteristic of the user terminal based on the indication contained in the connection authorization request;
  generating a connection authorization decision based on application of a Bluetooth connection rule to the characteristic of the user terminal;
  generating a connection authorization response containing an indication of the connection authorization decision and configured to control establishment of a Bluetooth connection between the video display unit and the user terminal; and
  communicating the connection authorization response through the network interface to the one of the video display units.

15. The central Bluetooth controller of claim 14, wherein the operation for generating the connection authorization decision based on application of the Bluetooth connection rule to the characteristic of the user terminal, comprises:
  selecting a Bluetooth security mode from among a plurality of defined Bluetooth security modes based on the characteristic of the user terminal indicated by the connection authorization request; and
  generating the connection authorization decision to indicate the selected Bluetooth security mode.

16. The central Bluetooth controller of claim 15, wherein the operation for selecting the Bluetooth security mode comprises:
  identifying a class of Bluetooth operational capability of the user terminal based on the characteristic of the user terminal indicated by the connection authorization request; and
  selecting the Bluetooth security mode from among the plurality of defined Bluetooth security modes based on the class of Bluetooth operational capability that is identified.

17. The central Bluetooth controller of claim 15, wherein the operation for selecting the Bluetooth security mode comprises:
  determining whether the Bluetooth connection request was received from the user terminal through a Bluetooth transceiver of the video display unit or through a wired network connected to the network interface of the video display unit;
  responsive to determining that the Bluetooth connection request was received through the Bluetooth transceiver of the video display unit, selecting a first Bluetooth security mode from among the plurality of defined Bluetooth security modes that provides a first level of Bluetooth security pairing with the user terminal; and
  responsive to determining that the Bluetooth connection request was received through the wired network interface of the video display unit, selecting a second Bluetooth security mode from among the plurality of defined Bluetooth security modes that provides a second level of Bluetooth security pairing with the user terminal that is less secure than the first level of Bluetooth security pairing.

18. The central Bluetooth controller of 15, wherein the operation for selecting the Bluetooth security mode comprises:
  maintaining in a tracking repository a list of identifiers of trusted user terminals;
  determining an identifier of the user terminal based on the characteristic indicated by the connection authorization request;
  responsive to the identifier of the user terminal being determined to be among the list of identifiers of trusted user terminals maintained by the tracking repository, selecting a first Bluetooth security mode from among the plurality of defined Bluetooth security modes that triggers a Bluetooth transceiver of the video display unit to perform authentication of the user terminal during establishment of a paired connection with the user terminal and to then not encrypt data that is subsequently communicated through the paired connection; and
  responsive to the identifier of the user terminal being determined to not be among the list of identifiers of trusted user terminals maintained by the tracking repository, selecting a second Bluetooth security mode from among the plurality of defined Bluetooth security modes that triggers the Bluetooth transceiver of the video display unit to perform authentication of the user terminal during establishment of a paired connection with the user terminal and to then encrypt data that is subsequently communicated through the paired connection.

19. The central Bluetooth controller of claim 18, wherein the operation for selecting the Bluetooth security mode comprises:
  maintaining in the tracking repository a list of identifiers of user terminals that have been previously paired with one of the video display units;
  responsive to the identifier of the user terminal being determined to not be among the list of identifiers of trusted user terminals and being further determined to not be among the list of identifiers of user terminals that have been previously paired with one of the video display units, selecting a third Bluetooth security mode from among the plurality of defined Bluetooth security modes that triggers the Bluetooth transceiver of the video display unit to perform authentication of the user terminal during establishment of a paired connection with the user terminal and to then encrypt data that is subsequently communicated through the paired connection using a greater strength of encryption relative to a strength of encryption that is used for the second Bluetooth security mode.

20. The central Bluetooth controller of claim 15, wherein the processor is further configured to:
  maintaining in a tracking repository a list of identifiers of prohibited user terminals;
  determining an identifier of the user terminal based on the characteristic indicated by the connection authorization request;
  responsive to the identifier of the user terminal being determined to be among the list of identifiers of prohibited user terminals, configuring the connection authorization decision within the connection authorization response to trigger a Bluetooth transceiver of the video display unit to prevent establishment of a paired connection with the user terminal; and responsive to the identifier of the user terminal being determined to not be among the list of identifiers of prohibited user terminals, selecting a Bluetooth security mode from among a plurality of defined Bluetooth security modes and configuring the connection authorization decision within the connection authorization response to indicate the selected Bluetooth security mode.

21. The central Bluetooth controller of claim 14, wherein the operation for generating the connection authorization decision based on application of the Bluetooth connection rule to the characteristic of the user terminal, comprises:

maintaining in a tracking repository a list identifying which identifiers of user terminals have been assigned for Bluetooth connection to which identifiers of video display units;

determining an identifier of the user terminal and an identifier of the video display unit based on the characteristic indicated by the connection authorization request;

responsive to determining that the identifier of the user terminal is not identified in the list as being assigned for Bluetooth connection with the identifier of the video display unit, configuring the connection authorization decision within the connection authorization response to trigger the Bluetooth transceiver of the video display unit to prevent establishment of a paired connection with the user terminal; and responsive to determining that the identifier of the user terminal is identified in the list as being assigned for Bluetooth connection with the identifier of the video display unit, selecting a Bluetooth security mode from among a plurality of defined Bluetooth security modes and configuring the connection authorization decision within the connection authorization response to indicate the selected Bluetooth security mode.

* * * * *